United States Patent
Massingham et al.

(10) Patent No.: US 12,437,184 B2
(45) Date of Patent: *Oct. 7, 2025

(54) MACHINE LEARNING ANALYSIS OF NANOPORE MEASUREMENTS

(71) Applicant: Oxford Nanopore Technologies PLC, Oxford (GB)

(72) Inventors: Timothy Lee Massingham, Oxford (GB); Joseph Edward Harvey, Oxford (GB)

(73) Assignee: Oxford Nanopore Technologies PLC, Oxford (GB)

(*) Notice: Subject to any disclaimer, the term of this patent is extended or adjusted under 35 U.S.C. 154(b) by 1341 days.

This patent is subject to a terminal disclaimer.

(21) Appl. No.: 16/610,897

(22) PCT Filed: May 4, 2018

(86) PCT No.: PCT/GB2018/051208
§ 371 (c)(1),
(2) Date: Nov. 4, 2019

(87) PCT Pub. No.: WO2018/203084
PCT Pub. Date: Nov. 8, 2018

(65) Prior Publication Data
US 2020/0309761 A1   Oct. 1, 2020
US 2024/0370696 A2   Nov. 7, 2024

(30) Foreign Application Priority Data
May 4, 2017   (GB) .................... 1707138

(51) Int. Cl.
*G06N 3/044*   (2023.01)
*C12Q 1/6869*   (2018.01)
(Continued)

(52) U.S. Cl.
CPC ....... *G06N 3/044* (2023.01); *G01N 33/48721* (2013.01); *G06F 18/22* (2023.01); *G06N 7/01* (2023.01); *C12Q 1/6869* (2013.01)

(58) Field of Classification Search
CPC .... G06N 3/044; G06N 7/01; G01N 33/48721; G06F 18/22; C12Q 1/6869
(Continued)

(56) References Cited

U.S. PATENT DOCUMENTS

| | | | |
|---|---|---|---|
| 6,087,099 | A | 7/2000 | Gupte et al. |
| 8,486,630 | B2 | 7/2013 | Pan et al. |

(Continued)

FOREIGN PATENT DOCUMENTS

| | | |
|---|---|---|
| AU | 2010326349 A1 | 6/2012 |
| CN | 101680873 A | 3/2010 |

(Continued)

OTHER PUBLICATIONS

Boža, Vladimír, Broňa Brejová, and TomášVinař. "DeepNano: Deep Recurrent Neural Networks for Base Calling in MinION Nanopore Reads." arXiv preprint arXiv:1603.09195 (2016). (Year: 2016).*

(Continued)

*Primary Examiner* — Olivia M. Wise
*Assistant Examiner* — Mary C Leverett
(74) *Attorney, Agent, or Firm* — Wolf, Greenfield & Sacks, P.C.

(57) ABSTRACT

A series of measurements taken from a polymer during translocation through a nanopore is analysed using a machine learning technique using a recurrent neural network (RNN). The RNN may derive posterior probability matrices each representing, in respect of different respective historical sequences of polymer units corresponding to measurements prior to the respective measurement, posterior probabilities of plural different changes to the respective (Continued)

historical sequence of polymer units giving rise to a new sequence of polymer units. Alternatively, the RNN may output decisions on the identity of successive polymer units of the series of polymer units, wherein the decisions are fed back into the recurrent neural network. The analysis may comprise performing convolutions of groups of consecutive measurements using a trained feature detector such as a convolutional neural network to derive a series of feature vectors, on which the RNN operates.

20 Claims, 8 Drawing Sheets

(51) Int. Cl.
  *G01N 33/487* (2006.01)
  *G06F 18/22* (2023.01)
  *G06N 7/01* (2023.01)
(58) Field of Classification Search
  USPC .......................................................... 702/19
  See application file for complete search history.

(56) References Cited

U.S. PATENT DOCUMENTS

| | | |
|---|---|---|
| 10,017,814 B2 | 7/2018 | Gundlach et al. |
| 2012/0322692 A1 | 12/2012 | Pham et al. |
| 2013/0217006 A1 | 8/2013 | Sorenson et al. |
| 2013/0327644 A1 | 12/2013 | Turner et al. |
| 2014/0052381 A1 | 2/2014 | Utiramerur et al. |
| 2015/0057948 A1 | 2/2015 | Reid et al. |
| 2017/0067101 A1 | 3/2017 | Clarke et al. |
| 2018/0164280 A1 | 6/2018 | Ecker et al. |
| 2018/0179591 A1 | 6/2018 | Belgrader et al. |
| 2020/0176082 A1 | 6/2020 | Massingham |
| 2022/0213541 A1 | 7/2022 | Brown et al. |

FOREIGN PATENT DOCUMENTS

| | | |
|---|---|---|
| CN | 104321441 A | 1/2015 |
| WO | WO 2000/028312 A1 | 5/2000 |
| WO | WO 2000/079257 A1 | 12/2000 |
| WO | WO 2005/124888 A1 | 12/2005 |
| WO | WO 2008/102120 A2 | 8/2008 |
| WO | WO 2008/102210 A2 | 8/2008 |
| WO | WO 2008/124107 A1 | 10/2008 |
| WO | WO 2009/035647 A1 | 3/2009 |
| WO | WO 2009/077734 A2 | 6/2009 |
| WO | WO 2010/086603 A1 | 8/2010 |
| WO | WO 2010/109197 A2 | 9/2010 |
| WO | WO 2010/122293 A1 | 10/2010 |
| WO | WO 2011/046706 A1 | 4/2011 |
| WO | WO 2011/067559 A1 | 6/2011 |
| WO | WO 2012/005857 A1 | 1/2012 |
| WO | WO 2012/033524 A2 | 3/2012 |
| WO | WO 2012/107778 A2 | 8/2012 |
| WO | WO 2012/138357 A1 | 10/2012 |
| WO | WO 2013/014451 A1 | 1/2013 |
| WO | WO 2013/041878 A1 | 3/2013 |
| WO | WO 2013/083983 A1 | 6/2013 |
| WO | WO 2013/121224 A1 | 8/2013 |
| WO | WO 2013/153359 A1 | 10/2013 |
| WO | WO 2014/064443 A2 | 5/2014 |
| WO | WO 2014/064444 A1 | 5/2014 |
| WO | WO 2015/124935 A1 | 8/2015 |
| WO | WO 2015/140535 A1 | 9/2015 |
| WO | WO 2016/034591 A2 | 3/2016 |
| WO | WO 2016/181118 A1 | 11/2016 |
| WO | WO 2016/187519 A1 | 11/2016 |
| WO | WO 2018/115855 A1 | 6/2018 |
| WO | WO 2018/203084 A1 | 11/2018 |
| WO | WO 2019/220094 A1 | 11/2019 |

OTHER PUBLICATIONS

Rand, Arthur C., et al. "Mapping DNA methylation with high-throughput nanopore sequencing." Nature methods 14.4 (2017): 411-413. (Year: 2017).*
Rand Supplemental "Mapping DNA methylation with high-throughput nanopore sequencing." Nature methods 14.4 (2017): 411-413. (Year: 2017).*
De Mulder, Wim, Steven Bethard, and Marie-Francine Moens. "A survey on the application of recurrent neural networks to statistical language modeling." Computer Speech & Language 30.1 (2015): 61-98. (Year: 2015).*
Deamer, David, Mark Akeson, and Daniel Branton. "Three decades of nanopore sequencing." Nature biotechnology 34.5 (2016):518-524. (Year: 2016).*
International Search Report and Written Opinion from Application No. PCT/GB2018/051208, mailed Jul. 24, 2018.
International Preliminary Report on Patentability for Application No. PCT/GB2018/051208, mailed Nov. 14, 2019.
Amodei et al., Deep Speech 2: End-to-End Speech Recognition in English and Mandarin Baidu Research—Silicon Valley AI Lab. Dec. 8, 2015. Retrieved from https://arxiv.org/pdf/1512.02595v1.pdf. 28 pages.
Boža et al., DeepNano: Deep recurrent neural networks for base calling in MinION nanopore reads. Corr ARXIV. Mar. 30, 2016. 12 pages. Author Manuscript.
Boža et al., DeepNano: Deep recurrent neural networks for base calling in MinION nanopore reads. PLoS One. Jun. 5, 2017;12(6):e0178751. doi: 10.1371/journal.pone.0178751. eCollection 2017.
Butler et al., Single-molecule DNA detection with an engineered MspA protein nanopore. Proc Natl Acad Sci U S A. Dec. 30, 2008;105(52):20647-52. doi: 10.1073/pnas.0807514106. Epub Dec. 19, 2008.
Fernández et al., An Application of Recurrent Neural Networks to Discriminative Keyword Spotting. ICANN 2007: Artificial Neural Networks. pp. 220-229. 2007. 10 pages.
Gers et al., Recurrent nets that time and count. Proceedings of the IEEE-INNS-ENNS International Joint Conference on Neural Networks. IJCNN 2000. Neural Computing: New Challenges and Perspectives for the New Millennium. Jul. 27, 2000. doi: 10.1109/IJCNN.2000.861302. Epub Aug. 6, 2002. 7 pages.
González-Pérez et al., Biomimetic triblock copolymer membrane arrays: a stable template for functional membrane proteins. Langmuir. Sep. 15, 2009;25(18):10447-50. doi: 10.1021/la902417m.
Graves et al., Connectionist Temporal Classification: Labelling Unsegmented Sequence Data with Recurrent Neural Networks. Proceedings of the 23rd International Conference on Machine Learning, Pittsburgh, PA. 2006:369-76. doi: 10.1145/1143844.1143891. 8 pages.
Graves et al., Speech recognition with deep recurrent neural networks. 2013 IEEE International Conference on Acoustics, Speech and Signal Processing. May 26-31, 2013. doi: 10.1109/ICASSP.2013.6638947. Epub Oct. 21, 2013. 5 pages.
Graves, Sequence Transduction with Recurrent Neural Networks. International Conference on Machine Learning: Representation Learning Workshop. 2012. 9 pages.
Heron et al., Simultaneous measurement of ionic current and fluorescence from single protein pores. J Am Chem Soc. Feb. 11, 2009;131(5):1652-3. doi: 10.1021/ja808128s.
Hochreiter et al., Long short-term memory. Neural Comput. Nov. 15, 1997;9(8):1735-80.
Ivanov et al., DNA tunneling detector embedded in a nanopore. Nano Lett. Jan. 12, 2011;11(1):279-85. doi: 10.1021/nl103873a. Epub Dec. 6, 2010.
Lafferty et al., Conditional Random Fields: Probabilistic Models for Segmenting and Labeling Sequence Data. Proceedings of the 18th International Conference on Machine Learning 2001. Jun. 2001. 10 pages.
Lieberman et al., Processive replication of single DNA molecules in a nanopore catalyzed by phi29 DNA polymerase. J Am Chem Soc. Dec. 22, 2010;132(50):17961-72. doi: 10.1021/ja1087612. Epub Dec. 1, 2010.

(56) References Cited

OTHER PUBLICATIONS

Luan et al., Base-by-base ratcheting of single stranded DNA through a solid-state nanopore. Phys Rev Lett. Jun. 11, 2010;104(23):238103. Epub Jun. 10, 2010.

McCallum et al., Maximum Entropy Markov Models for Information Extraction and Segmentation. Proceedings of the Seventeenth International Conference on Machine Learning Jun. 2000. pp. 591-598. 8 pages.

Soni et al., Synchronous optical and electrical detection of biomolecules traversing through solid-state nanopores. Rev Sci Instrum. Jan. 2010; 81(1): 014301. Epub Jan. 19, 2010. doi: 10.1063/1.3277116.

Stoddart et al., Multiple base-recognition sites in a biological nanopore: two heads are better than one. Angew Chem Int Ed Engl. 2010;49(3):556-9. doi: 10.1002/anie.200905483.

Stoddart et al., Nucleobase recognition in ssDNA at the central constriction of the alpha-hemolysin pore. Nano Lett. Sep. 8, 2010;10(9):3633-7. doi: 10.1021/nl101955a.

Stoddart et al., Single-nucleotide discrimination in immobilized DNA oligonucleotides with a biological nanopore. Proc Natl Acad Sci U S A. May 12, 2009;106(19):7702-7. doi: 10.1073/pnas.0901054106. Epub Apr. 20, 2009.

Stoiber et al., BasecRAWller: Streaming Nanopore Basecalling Directly form Raw Signal. bioRxiv Preprint. May 1, 2017. doi: http://dx.doi/org/10.11101.133058. Retrieved from https://www.biorxiv.org/content/biorxi v/early/2017/05/01/133058.full.pdf. 15 pages.

International Search Report and Written Opinion from Application No. PCT/GB2019/052456, mailed Dec. 13, 2019.

International Preliminary Report on Patentability for Application No. PCT/GB2019/052456, mailed Mar. 18, 2021.

Eid et al., Real-time DNA sequencing from single polymerase molecules. Science. Jan. 2, 2009; 323(5910): 133-8. doi: 10.1126/science.1162986. Epub Nov. 20, 2008.

Fuller et al., Real-time single-molecule electronic DNA sequencing by synthesis using polymer-tagged nucleotides on a nanopore array. Proc Natl Acad Sci U S A. May 10, 2016;113(19):5233-8. doi: 10.1073/pnas.1601782113. Epub Apr. 18, 2016.

Haque et al., Solid-State and Biological Nanopore for Real-Time Sensing of Single Chemical and Sequencing of DNA. Nano Today. Feb. 2013;8(1):56-74. doi: 10.1016/j.nantod.2012.12.008.

Im et al., Recognition Tunneling of Canonical and Modified RNA Nucleotides for Their Identification with the Aid of Machine Learning. ACS Nano. Jul. 24, 2018; 12(7): 7067-7075.

Ni et al., DeepSignal: detecting DNA methylation state from Nanopore sequencing reads using deep-learning. Bioinformatics. Nov. 15, 2019;35(22):4586-95.doi: 10.1093/bioinformatics/btz276.

Nivala et al., Unfoldase-mediated protein translocation through an α-hemolysin nanopore. Nat Biotechnol. Mar. 2013; 31(3): 247-50. Author manuscript. 10 pages.

Rang et al., From squiggle to basepair: computational approaches for improving nanopore sequencing read accuracy. Genome Biol. Jul. 13, 2018;19(1):90. doi: 10.1186/s13059-018-1462-9.

Sedlazeck et al., Piercing the dark matter: bioinformatics of long-range sequencing and mapping. Nat Rev Genet. Jun. 2018; 19(6): 329-346.

Simpson et al., Detecting DNA cytosine methylation using nanopore sequencing. Nat Methods. Apr. 2017;14(4):407-410. doi: 10.1038/nmeth.4184. Epub Feb. 20, 2017.

Soltau et al., Neural speech recognizer: Acoustic-to-word LSTM model for large vocabulary speech recognition. arXiv preprint arXiv:1610.09975. Oct. 31, 2016.

Stoiber et al., De novo Identification of DNA Modifications Enabled by Genome-Guided Nanopore Signal Processing. BioRxiv Preprint. Apr. 10, 2017; doi: https://doi.org/10.1101/094672. Accessible at https://www.biorxiv.org/content/10.1101/094672v2. 15 pages. Suppl Info 10 pages. First printed online Dec. 15, 2016.

Teng et al., Chiron: translating nanopore raw signal directly into nucleotide sequence using deep learning. Gigascience. May 1, 2018; 7(5): 1-9.

Third Party Observations for Application No. EP 18723942.1, mailed May 3, 2023.

Wang et al., Solid-State Nanopore Analysis of Diverse DNA Base Modifications Using a Modular Enzymatic Labeling Process. Nano Lett. Nov. 8, 2017; 17(11): 7110-7116. doi: 10.1021/acs.nanolett.7b03911. Epub Oct. 5, 2017.

Extended European Search Report for Application No. EP 24170727.2, mailed Jul. 25, 2024.

[No Author Listed] Oxford Nanopore Technologies: "Basecalling overview", Aug. 22, 2016 (Aug. 22, 2016), XP093186903, Retrieved from the Internet: URL:https://community.nanoporetech.com/technical_documents/data-analysis/v/datd_5000_v1_revr_22aug2016/basecalling-overview (retrieved on Jul. 17, 2024), 2 pages.

Ansorge, Next-generation DNA sequencing techniques. N Biotechnol. Apr. 2009;25(4):195-203. doi: 10.1016/j.nbt.2008.12.009. Epub Feb. 3, 2009.

Trigeorgis et al., Adieu features? end-to-end speech emotion recognition using a deep convolutional recurrent network. 2016 IEEE international conference on acoustics, speech and signal processing (ICASSP) Mar. 20, 2016 (pp. 5200-5204). IEEE.

EP 24170727.2, Jul. 25, 2024, Extended European Search Report.

\* cited by examiner

41 ⟶ A A A     A A A     A C A     A C A

42 ⟶ A A       A         C A        —

```
AAA ⟶ AAA : AAA
              AAAA
              AAAAA    ? ✓ +A
              AAAAAA

ACA ⟶ ACA : ACA
              ACACA    ? ✓ +A
              ACAACA
```

MACHINE LEARNING ANALYSIS OF NANOPORE MEASUREMENTS

RELATED APPLICATIONS

This Application is a national stage filing under 35 U.S.C. 371 of international application number PCT/GB2018/051208, filed May 4, 2018, which claims the benefit of United Kingdom application number 1707138.2, filed May 4, 2017, each of which is incorporated by reference in its entirety.

The present invention relates to the analysis of measurements taken from polymer units in a polymer, for example but without limitation a polynucleotide, during translocation of the polymer with respect to a nanopore.

A type of measurement system for estimating a target sequence of polymer units in a polymer uses a nanopore, and the polymer is translocated with respect to the nanopore. Some property of the system depends on the polymer units in the nanopore, and measurements of that property are taken. This type of measurement system using a nanopore has considerable promise, particularly in the field of sequencing a polynucleotide such as DNA or RNA, and has been the subject of much recent development.

Such nanopore measurement systems can provide long continuous reads of polynucleotides ranging from hundreds to hundreds of thousands (and potentially more) nucleotides. The data gathered in this way comprises measurements, such as measurements of ion current, where each translocation of the sequence with respect to the sensitive part of the nanopore can results in a change in the measured property.

According to a first aspect of the present invention, there is provided a method of analysis of a series of measurements taken from a polymer comprising a series of polymer units during translocation of the polymer with respect to a nanopore, the method comprising analysing the series of measurements using a machine learning technique and deriving a series of posterior probability matrices corresponding to respective measurements or respective groups of measurements, each posterior probability matrix representing, in respect of different respective historical sequences of polymer units corresponding to measurements prior or subsequent to the respective measurement, posterior probabilities of plural different changes to the respective historical sequence of polymer units giving rise to a new sequence of polymer units.

The series of posterior probability matrices representing posterior probabilities provide improved information about the series of polymer units from which measurements were taken and can be used in several applications. The series of posterior probability matrices may be used to derive a score in respect of at least one reference series of polymer units representing the probability of the series of polymer units of the polymer being the reference series of polymer units. Thus, the series of posterior probability matrices enable several applications, for example as follows.

Many applications involve derivation of an estimate of the series of polymer units from the series of posterior probability matrices. This may be an estimate of the series of polymer units as a whole. This may be done by finding the highest scoring such series from all possible series. For example, this may performed by estimating the most likely path through the series of posterior probability matrices.

Alternatively, an estimate of the series of polymer units may be found by selecting one of a set of plural reference series of polymer units to which the series of posterior probability matrices are most likely to correspond, for example based on the scores.

Another type of estimate of the series of polymer units may be found by estimating differences between the series of polymer units of the polymer and a reference series of polymer units. This may be done by scoring variations from the reference series.

Alternatively, the estimate may be an estimate of part of the series of polymer units. For example, it may be estimated whether part of the series of polymer units is a reference series of polymer units. This may be done by scoring the reference series against parts of the series of series of posterior probability matrices.

Such a method provides advantages over a comparative method that derives a series of posterior probability vectors representing posterior probabilities of plural different sequences of polymer units. In particular, the series of posterior probability matrices provide additional information to such posterior probability vectors that permits estimation of the series of polymer units in a manner that is more accurate. By way of example, this technique allows better estimation of regions of repetitive sequences, including regions where short sequences of one or more polymer units are repeated. Better estimation of homopolymers is a particular example of an advantage in a repetitive region.

To gain an intuition why this advantage exists, consider the problem of predicting on which day a parcel will be delivered. The arrival of each parcel is analogous to the extension of a predicted polymer sequence by one unit. A model which predicts states (e.g. Boia et al., DeepNano: Deep Recurrent Neural Networks for Base Calling in Minion Nanopore Reads, Cornell University Website, March 2016) will produce a probability that the parcel is delivered on each future day. If there is a great deal of uncertainty about the delivery date then the probability that the parcel is delivered on any particular day may be less than 50%, in which case the most probable sequence of events according to the model is that the parcel is never delivered. On the other hand, a model which predicts a change with respect to a history state might produce 2 probabilities for each day: 1) the probability that the parcel is delivered if it has not yet been delivered, which will increase as more days pass, and 2) the probability that the parcel is delivered if it has already been delivered, which will always be 0. Unlike the previous model, this model always predicts that the parcel is eventually delivered.

Analogously, state-based models tend to underestimate the lengths of repetitive polymer sequences compared to models that predict changes with respect to a history. This offers a particular advantage for homopolymer sequences because the sequence of measurements produced by a homopolymer tend to be very similar, making it difficult to assign measurements to each additional polymer unit.

Determination of homopolymer regions is particularly challenging in the context of nanopore sequencing involving the translocation of polymer strands, for example polynucleotide strands, through a nanopore in a step-wise fashion, for example by means of an enzyme molecular motor. The current measured during translocation is typically dependent upon multiple nucleotides and can be approximated to a particular number of nucleotides. The polynucleotide strand when translocated under enzyme control typically moves through the nanopore one base at a time. Thus for polynucleotide strands having a homopolymer length longer than the approximated number of nucleotides giving rise to the current signal, it can be difficult to determine the number of polymer units in the homopolymer region. One aspect of the invention seeks to improve the determination of homopolymer regions.

The machine learning technique may employ a recurrent neural network, which may optionally be a bidirectional recurrent neural network and/or comprise plural layers.

There are various different possibilities for the changes that the posterior probabilities represent, for example as follows.

The changes may include changes that remove a single polymer unit from the beginning or end of the historical sequence of polymer units and add a single polymer unit to the end or beginning of the historical sequence of polymer units.

The changes may include changes that remove two or more polymer units from the beginning or end of the historical sequence of polymer units and add two or more polymer units to the end or beginning of the historical sequence of polymer units.

The changes may include a null change.

The method may employ event calling and apply the machine learning technique to quantities derived from each event. For example, the method may comprise: identifying groups of consecutive measurements in the series of measurements as belonging to a common event; deriving one or more quantities from each identified group of measurements; and operating on the one of more quantities derived from each identified group of measurements using said machine learning technique. The method may operate on windows of said quantities. The method may derive posterior probability matrices that correspond to respective identified groups of measurements, which in general contain a number of measurements that is not known a priori and may be variable, so the relationship between the posterior probability matrices and the measurements depends on the number of measurements in the identified group.

The method may alternatively apply the machine learning technique to the measurements themselves. In this case, the method may derive posterior probability matrices that correspond to respective measurements or respective groups of a predetermined number of measurements, so the relationship between the posterior probability matrices and the measurements is predetermined.

For example, the analysis of the series of measurements may comprise: performing a convolution of consecutive measurements in successive windows of the series of measurements to derive a feature vector in respect of each window; and operating on the feature vectors using said machine learning technique. The windows may be overlapping windows. The convolutions may be performed by operating on the series of measurements using a trained feature detector, for example a convolutional neural network.

According to a second aspect of the present invention, there is provided a method of analysis of a series of measurements taken from a polymer comprising a series of polymer units during translocation of the polymer with respect to a nanopore, the method comprising analysing the series of measurements using a recurrent neural network that outputs decisions on the identity of successive polymer units of the series of polymer units, wherein the decisions are fed back into the recurrent neural network so as to inform subsequently output decisions.

Compared to a comparative method that derives posterior probability vectors representing posterior probabilities of plural different sequences of polymer units and then estimates the series of polymer units from the posterior probability vectors, the present method provides advantages because it effectively incorporates the estimation into the recurrent neural network. As a result the present method provides estimates of the identity of successive polymer units that may be more accurate.

The decisions may be fed back into the recurrent neural network unidirectionally.

The recurrent neural network may be a bidirectional recurrent neural network and/or comprise plural layers.

The method may employ event calling and apply the machine learning technique to quantities derived from each event. For example, the method may comprise: identifying groups of consecutive measurements in the series of measurements as belonging to a common event; deriving one or more quantities from each identified group of measurements; and operating on the one or more quantities derived from each identified group of measurements using said recurrent neural network. The method may operate on windows of said quantities. The method may derive decisions on the identity of successive polymer units that correspond to respective identified groups of measurements, which in general contain a number of measurements that is not known a priori and may be variable, so the relationship between the decisions on the identity of successive polymer units and the measurements depends on the number of measurements in the identified group.

The method may alternatively apply the machine learning technique to the measurements themselves. In this case, the method may derive decisions on the identity of successive polymer units that correspond to respective measurements or respective groups of a predetermined number of measurements, so the relationship between the decisions on the identity of successive polymer units and the measurements is predetermined.

For example, the analysis of the series of measurements may comprise: performing a convolution of consecutive measurements in successive windows of the series of measurements to derive a feature vector in respect of each window; and operating on the feature vectors using said machine learning technique. The windows may be overlapping windows. The convolutions may be performed by operating on the series of measurements using a trained feature detector, for example a convolutional neural network.

According to a third aspect of the present invention, there is provided a method of analysis of a series of measurements taken from a polymer comprising a series of polymer units during translocation of the polymer with respect to a nanopore, the method comprising: performing a convolution of consecutive measurements in successive windows of the series of measurements to derive a feature vector in respect of each window; and operating on the feature vectors using a recurrent neural network to derive information about the series of polymers units.

This method provides advantages over comparative methods that apply event calling and use a recurrent neural network to operate on a quantity or feature vector derived for each event. Specifically, the present method provides higher accuracy, in particular when the series of measurements does not exhibit events that are easily distinguished, for example where the measurements were taken at a relatively high sequencing rate.

The windows may be overlapping windows. The convolutions may be performed by operating on the series of measurements using a trained feature detector, for example a convolutional neural network.

The recurrent neural network may be a bidirectional recurrent neural network and/or may comprise plural layers.

The third aspect of the present invention may be applied in combination with the first or second aspects of the present invention.

The following comments apply to all the aspects of the present invention.

The present methods improve the accuracy in a manner which allows analysis to be performed in respect of series of measurements taken at relatively high sequencing rates. For example, the methods may be applied to a series of measurements taken at a rate of at least 10 polymer units per second, preferably 100 polymer units per second, more preferably 500 polymer units per second, or more preferably 1000 polymer units per second.

The nanopore may be a biological pore.

The polymer may be a polynucleotide, in which the polymer units are nucleotides.

The measurements may comprise one or more of: current measurements, impedance measurements, tunnelling measurements, FET measurements and optical measurements.

The method may further comprise taking said series of measurements.

The method, apart from the step of taking the series of measurements, may be performed in a computer apparatus.

According to further aspects of the invention, there may be provided an analysis system arranged to perform a method according to any of the first to third aspects. Such an analysis system may be implemented in a computer apparatus.

According to yet further aspects of the invention, there may be provided such an analysis system in combination with a measurement system arrange to take a series of measurements from a polymer during translocation of the polymer with respect to a nanopore.

To allow better understanding, embodiments of the present invention will now be described by way of non-limitative example with reference to the accompanying drawings, in which.

Figure 4:
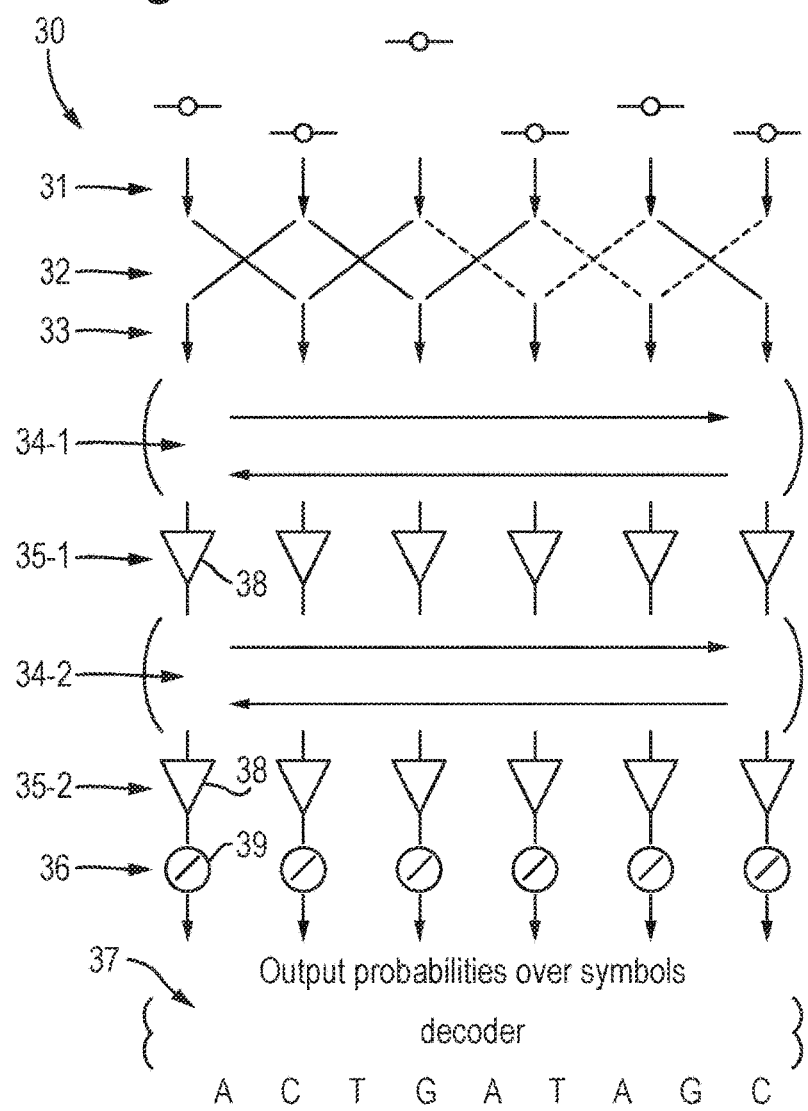
FIG. 4 is a schematic diagram illustrating the structure of an analysis system implemented by a recurrent neural net.
Figure 6:
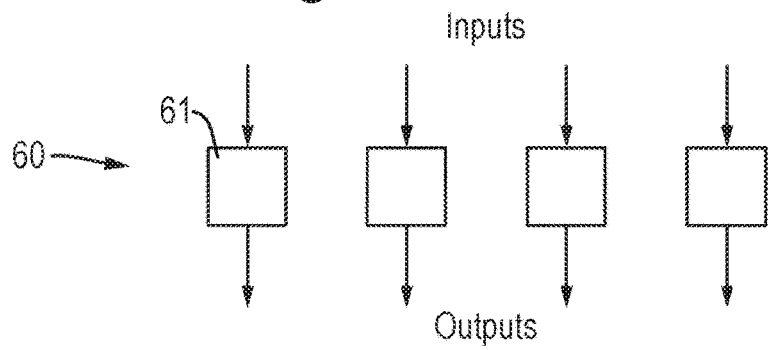
Figure 7:
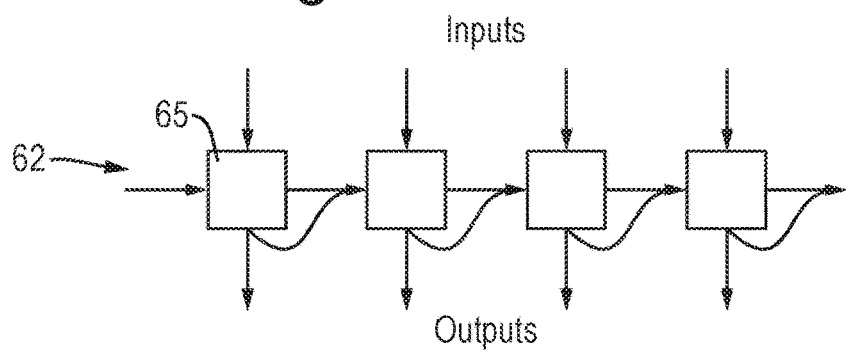
Figure 8:
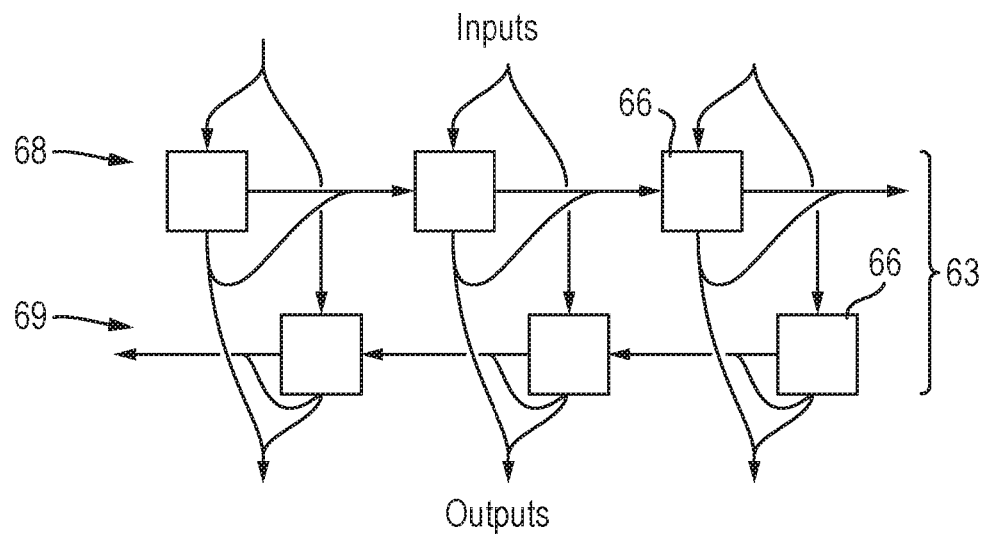
Figure 9:
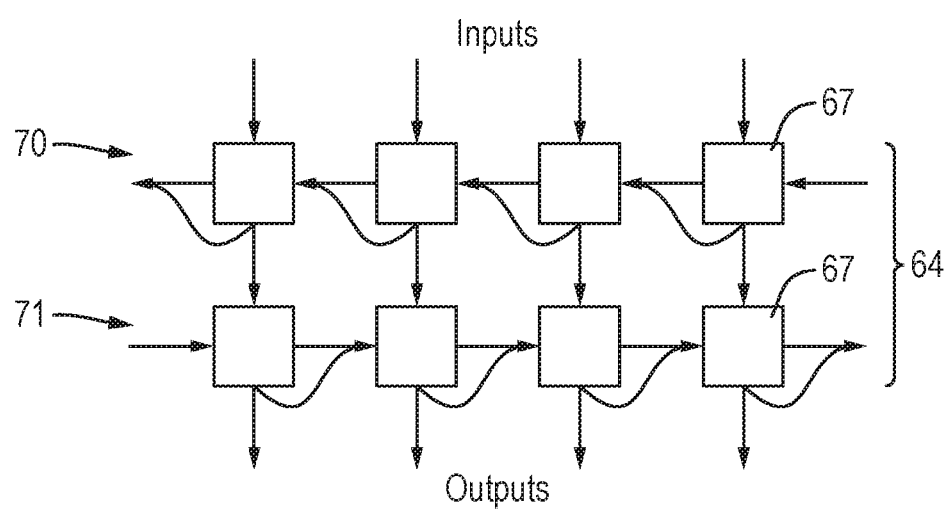
Figure 10:
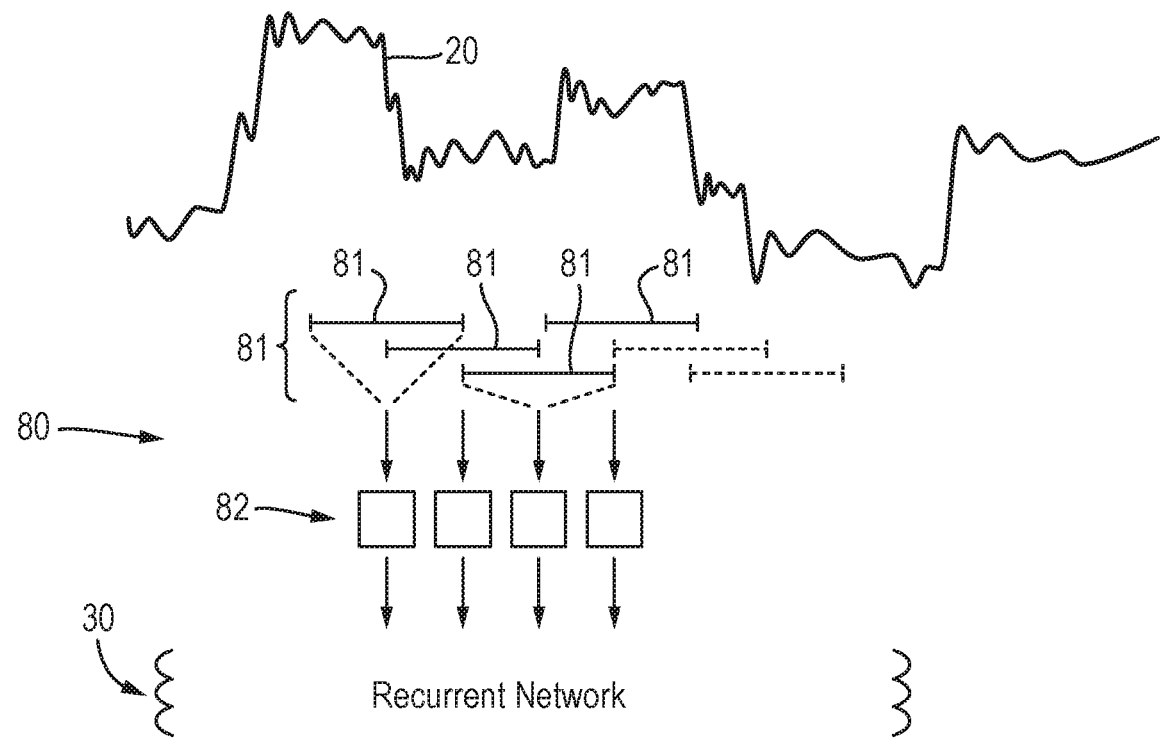
Figure 11:
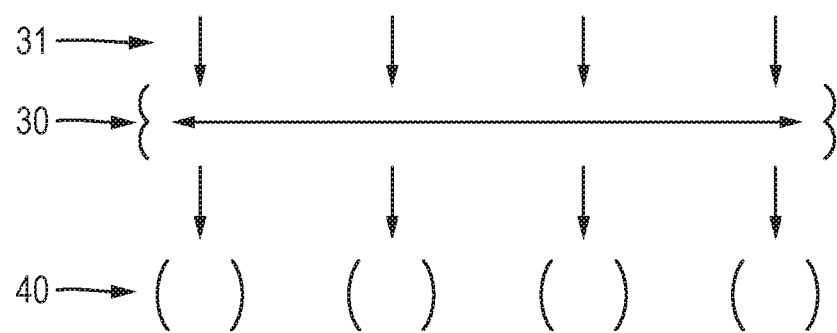
Figures 12, 13, 14:
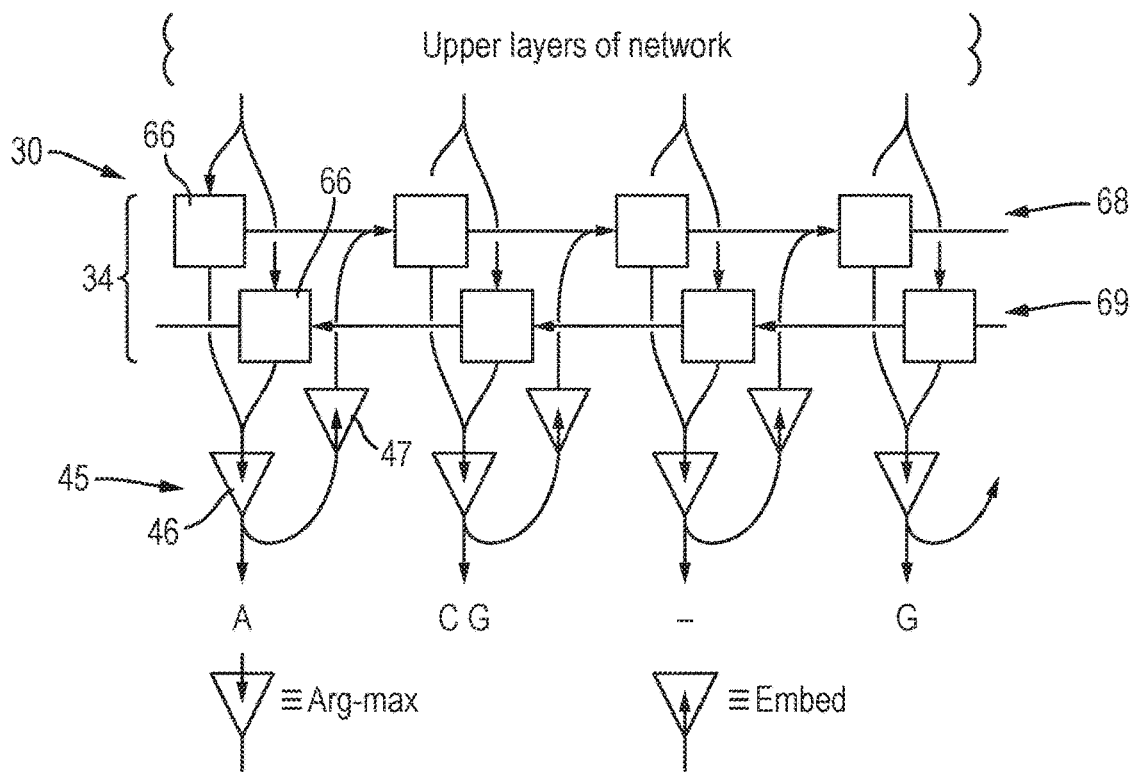
Figure 15:
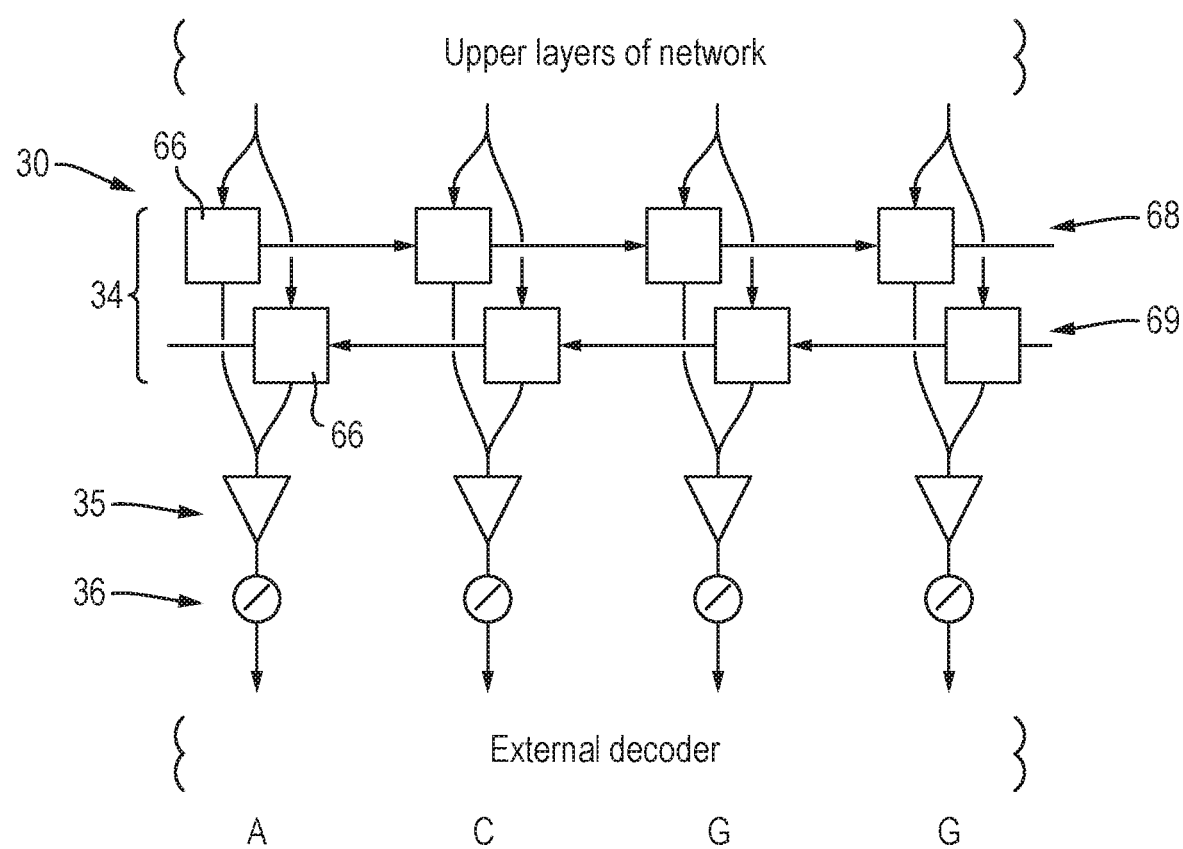
Figure 16:
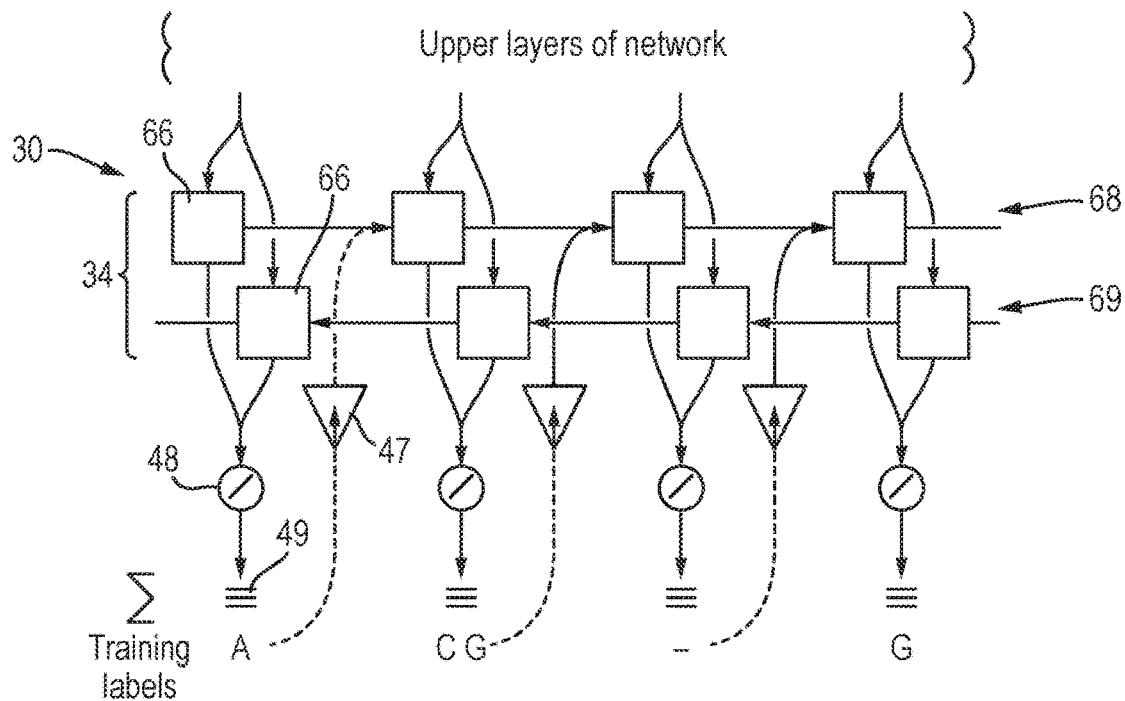
Figure 17:
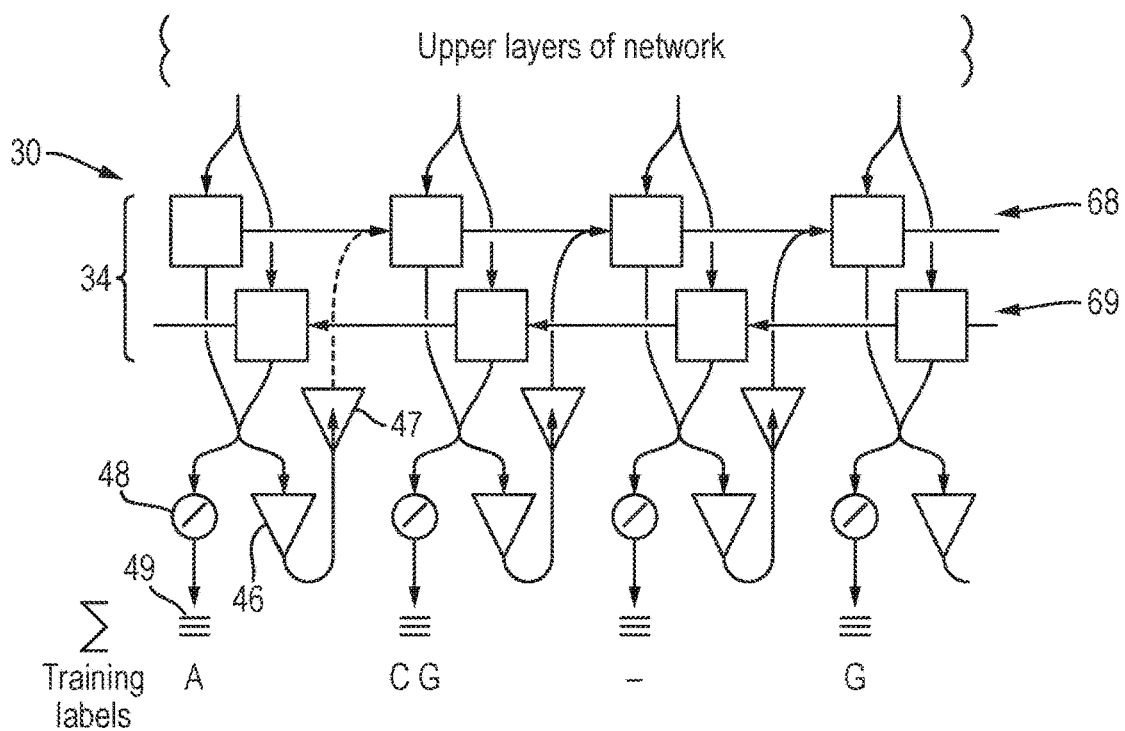

FIGS. 6 to 9 are schematic diagrams of layers in a neural network showing how units of the layer operate on a time-ordered series of input features, FIG. 6 showing a non-recurrent layer, FIG. 7 showing a unidirectional layer, FIG. 8 showing a bidirectional recurrent layer that combines a 'forward' and 'backward' recurrent layer, and FIG. 9 showing an alternative bidirectional recurrent layer that combines 'forward' and 'backward' recurrent layer in an alternating fashion;

FIG. 10 illustrates a modification to the analysis system of FIG. 4 to operate on measurements (raw data);

FIG. 11 illustrates a modification to the analysis system of FIG. 4;

FIG. 12 shows a sample output of the analysis system with the modification of FIG. 11;

FIG. 13 shows some sample cases where the basic method results in an ambiguous estimate of the series of polymer units whereas the sequence fragments of the movement-states in the modification of FIG. 11 are not ambiguous;

FIG. 14 illustrates a modification to the analysis system of FIG. 4 where the decoding has been pushed back into the lowest bidirectional recurrent layer;

FIG. 15 illustrates, by way of comparison, the final layers of the analysis system of FIG. 4, and its decoder; and FIGS. 16 and 17 illustrate two alternative modification to the analysis system of FIG. 14 to enable training by perplexity.

Figure 1:
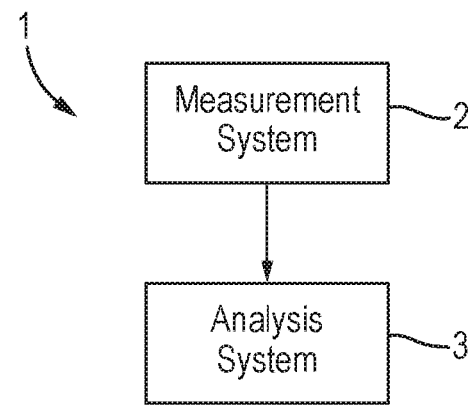
FIG. 1 is a schematic diagram of a nanopore measurement and analysis system.

FIG. 1 illustrates a nanopore measurement and analysis system 1 comprising a measurement system 2 and an analysis system 3. The measurement system 2 takes a series of measurements from a polymer comprising a series of polymer units during translocation of the polymer with respect to a nanopore. The analysis system 3 performs a method of analysing the series of measurements to obtain further information about the polymer, for example an estimate of the series of polymer units.

In general, the polymer may be of any type, for example a polynucleotide (or nucleic acid), a polypeptide such as a protein, or a polysaccharide. The polymer may be natural or synthetic. The polynucleotide may comprise a homopolymer region. The homopolymer region may comprise between 5 and 15 nucleotides.

In the case of a polynucleotide or nucleic acid, the polymer units may be nucleotides. The nucleic acid is typically deoxyribonucleic acid (DNA), ribonucleic acid (RNA), cDNA or a synthetic nucleic acid known in the art, such as peptide nucleic acid (PNA), glycerol nucleic acid (GNA), threose nucleic acid (TNA), locked nucleic acid (LNA) or other synthetic polymers with nucleotide side chains. The PNA backbone is composed of repeating N-(2-aminoethyl)-glycine units linked by peptide bonds. The GNA backbone is composed of repeating glycol units linked by phosphodiester bonds. The TNA backbone is composed of repeating threose sugars linked together by phosphodiester bonds. LNA is formed from ribonucleotides as discussed above having an extra bridge connecting the 2' oxygen and 4' carbon in the ribose moiety. The nucleic acid may be single-stranded, be double-stranded or comprise both single-stranded and double-stranded regions. The nucleic acid may comprise one strand of RNA hybridised to one strand of DNA. Typically cDNA, RNA, GNA, TNA or LNA are single stranded.

The polymer units may be any type of nucleotide. The nucleotide can be naturally occurring or artificial. For instance, the method may be used to verify the sequence of a manufactured oligonucleotide. A nucleotide typically contains a nucleobase, a sugar and at least one phosphate group. The nucleobase and sugar form a nucleoside. The nucleobase is typically heterocyclic. Suitable nucleobases include purines and pyrimidines and more specifically adenine, guanine, thymine, uracil and cytosine. The sugar is typically a pentose sugar. Suitable sugars include, but are not limited to, ribose and deoxyribose. The nucleotide is typically a ribonucleotide or deoxyribonucleotide. The nucleotide typically contains a monophosphate, diphosphate or triphosphate.

The nucleotide can be a damaged or epigenetic base. For instance, the nucleotide may comprise a pyrimidine dimer. Such dimers are typically associated with damage by ultraviolet light and are the primary cause of skin melanomas. The nucleotide can be labelled or modified to act as a marker with a distinct signal. This technique can be used to identify the absence of a base, for example, an abasic unit or spacer in the polynucleotide. The method could also be applied to any type of polymer.

In the case of a polypeptide, the polymer units may be amino acids that are naturally occurring or synthetic.

In the case of a polysaccharide, the polymer units may be monosaccharides.

Particularly where the measurement system 2 comprises a nanopore and the polymer comprises a polynucleotide, the polynucleotide may be long, for example at least 5 kB (kilo-bases), i.e. at least 5,000 nucleotides, or at least 30 kB(kilo-bases), i.e. at least 30,000 nucleotides, or at least 100 kB(kilo-bases), i.e. at least 100,000 nucleotides.

The nature of the measurement system 2 and the resultant measurements is as follows.

The measurement system 2 is a nanopore system that comprises one or more nanopores. In a simple type, the measurement system 2 has only a single nanopore, but a more practical measurement systems 2 employ many nanopores, typically in an array, to provide parallelised collection of information.

The measurements may be taken during translocation of the polymer with respect to the nanopore, typically through the nanopore. Thus, successive measurements are derived from successive portions of the polymer.

The nanopore is a pore, typically having a size of the order of nanometres, that may allows the passage of polymers therethrough.

A property that depends on the polymer units translocating with respect to the pore may be measured. The property may be associated with an interaction between the polymer and the pore. Such an interaction may occur at a constricted region of the pore.

The nanopore may be a biological pore or a solid state pore. The dimensions of the pore may be such that only one polymer may translocate the pore at a time.

Where the nanopore is a biological pore, it may have the following properties.

The biological pore may be a transmembrane protein pore. Transmembrane protein pores for use in accordance with the invention can be derived from β-barrel pores or α-helix bundle pores. β-barrel pores comprise a barrel or channel that is formed from β-strands. Suitable β-barrel pores include, but are not limited to, β-toxins, such as α-hemolysin, anthrax toxin and leukocidins, and outer membrane proteins/porins of bacteria, such as *Mycobacterium smegmatis* porin (Msp), for example MspA, MspB, MspC or MspD, lysenin, outer membrane porin F (OmpF), outer membrane porin G (OmpG), outer membrane phospholipase A and *Neisseria* autotransporter lipoprotein (NalP). α-helix bundle pores comprise a barrel or channel that is formed from α-helices. Suitable α-helix bundle pores include, but are not limited to, inner membrane proteins and a outer membrane proteins, such as WZA and ClyA toxin. The transmembrane pore may be derived from Msp or from α-hemolysin (α-HL). The transmembrane pore may be derived from lysenin. Suitable pores derived from lysenin are disclosed in WO 2013/153359. Suitable pores derived from MspA are disclosed in WO-2012/107778. The pore may be derived from CsgG, such as disclosed in WO-2016/034591.

The biological pore may be a naturally occurring pore or may be a mutant pore. Typical pores are described in WO-2010/109197, Stoddart D et al., Proc Natl Acad Sci, 12; 106(19):7702-7, Stoddart D et al., Angew Chem Int Ed Engl. 2010; 49(3):556-9, Stoddart D et al., Nano Lett. 2010 Sep. 8; 10(9):3633-7, Butler T Z et al., Proc Natl Acad Sci 2008; 105(52):20647-52, and WO-2012/107778.

The biological pore may be one of the types of biological pores described in WO-2015/140535 and may have the sequences that are disclosed therein.

The biological pore may be inserted into an amphiphilic layer such as a biological membrane, for example a lipid bilayer. An amphiphilic layer is a layer formed from amphiphilic molecules, such as phospholipids, which have both hydrophilic and lipophilic properties. The amphiphilic layer may be a monolayer or a bilayer. The amphiphilic layer may be a co-block polymer such as disclosed in Gonzalez-Perez et al., Langmuir, 2009, 25, 10447-10450 or WO2014/064444. Alternatively, a biological pore may be inserted into a solid state layer, for example as disclosed in WO2012/005857.

A suitable apparatus for providing an array of nanopores is disclosed in WO-2014/064443. The nanopores may be provided across respective wells wherein electrodes are provided in each respective well in electrical connection with an ASIC for measuring current flow through each nanopore. A suitable current measuring apparatus may comprise the current sensing circuit as disclosed in PCT Patent Application No. PCT/GB2016/051319

The nanopore may comprise an aperture formed in a solid state layer, which may be referred to as a solid state pore. The aperture may be a well, gap, channel, trench or slit provided in the solid state layer along or into which analyte may pass. Such a solid-state layer is not of biological origin. In other words, a solid state layer is not derived from or isolated from a biological environment such as an organism or cell, or a synthetically manufactured version of a biologically available structure. Solid state layers can be formed from both organic and inorganic materials including, but not limited to, microelectronic materials, insulating materials such as Si3N4, Al2O3, and SiO, organic and inorganic polymers such as polyamide, plastics such as Teflon® or elastomers such as two-component addition-cure silicone rubber, and glasses. The solid state layer may be formed from graphene. Suitable graphene layers are disclosed in WO-2009/035647, WO-2011/046706 or WO-2012/138357. Suitable methods to prepare an array of solid state pores is disclosed in WO-2016/187519.

Such a solid state pore is typically an aperture in a solid state layer. The aperture may be modified, chemically, or otherwise, to enhance its properties as a nanopore. A solid state pore may be used in combination with additional components which provide an alternative or additional measurement of the polymer such as tunnelling electrodes (Ivanov A P et al., Nano Lett. 2011 Jan. 12; 11(1):279-85), or a field effect transistor (FET) device (as disclosed for example in WO-2005/124888). Solid state pores may be formed by known processes including for example those described in WO-00/79257.

In one type of measurement system 2, there may be used measurements of the ion current flowing through a nanopore. These and other electrical measurements may be made using standard single channel recording equipment as describe in Stoddart D et al., Proc Natl Acad Sci, 12; 106(19):7702-7, Lieberman K R et al, J Am Chem Soc. 2010; 132(50):17961-72, and WO-2000/28312. Alternatively, electrical measurements may be made using a multi-channel system, for example as described in WO-2009/077734, WO-2011/067559 or WO-2014/064443.

Ionic solutions may be provided on either side of the membrane or solid state layer, which ionic solutions may be present in respective compartments. A sample containing the polymer analyte of interest may be added to one side of the membrane and allowed to move with respect to the nanopore, for example under a potential difference or chemical gradient. Measurements may be taken during the movement of the polymer with respect to the pore, for example taken during translocation of the polymer through the nanopore. The polymer may partially translocate the nanopore.

In order to allow measurements to be taken as the polymer translocates through a nanopore, the rate of translocation can be controlled by a polymer binding moiety. Typically the moiety can move the polymer through the nanopore with or against an applied field. The moiety can be a molecular motor using for example, in the case where the moiety is an enzyme, enzymatic activity, or as a molecular brake. Where the polymer is a polynucleotide there are a number of methods proposed for controlling the rate of translocation including use of polynucleotide binding enzymes. Suitable enzymes for controlling the rate of translocation of polynucleotides include, but are not limited to, polymerases, helicases, exonucleases, single stranded and double stranded binding proteins, and topoisomerases, such as gyrases. For other polymer types, moieties that interact with that polymer type can be used. The polymer interacting moiety may be any disclosed in WO-2010/086603, WO-2012/107778, and Lieberman K R et al, J Am Chem Soc. 2010; 132(50):17961-72), and for voltage gated schemes (Luan B et al., Phys Rev Lett. 2010; 104(23):238103).

The polymer binding moiety can be used in a number of ways to control the polymer motion. The moiety can move the polymer through the nanopore with or against the applied field. The moiety can be used as a molecular motor using for example, in the case where the moiety is an enzyme, enzymatic activity, or as a molecular brake. The translocation of the polymer may be controlled by a molecular ratchet that controls the movement of the polymer through the pore. The molecular ratchet may be a polymer binding protein. For polynucleotides, the polynucleotide binding protein is preferably a polynucleotide handling enzyme. A polynucleotide handling enzyme is a polypeptide that is capable of interacting with and modifying at least one property of a polynucleotide. The enzyme may modify the polynucleotide by cleaving it to form individual nucleotides or shorter chains of nucleotides, such as di- or trinucleotides. The enzyme may modify the polynucleotide by orienting it or moving it to a specific position. The polynucleotide handling enzyme does not need to display enzymatic activity as long as it is capable of binding the target polynucleotide and controlling its movement through the pore. For instance, the enzyme may be modified to remove its enzymatic activity or may be used under conditions which prevent it from acting as an enzyme. Such conditions are discussed in more detail below.

Preferred polynucleotide handling enzymes are polymerases, exonucleases, helicases and topoisomerases, such as gyrases. The polynucleotide handling enzyme may be for example one of the types of polynucleotide handling enzyme described in WO-2015/140535 or WO-2010/086603.

Translocation of the polymer through the nanopore may occur, either cis to trans or trans to cis, either with or against an applied potential. The translocation may occur under an applied potential which may control the translocation.

Exonucleases that act progressively or processively on double stranded DNA can be used on the cis side of the pore to feed the remaining single strand through under an applied potential or the trans side under a reverse potential. Likewise, a helicase that unwinds the double stranded DNA can also be used in a similar manner. There are also possibilities for sequencing applications that require strand translocation against an applied potential, but the DNA must be first "caught" by the enzyme under a reverse or no potential. With the potential then switched back following binding the strand will pass cis to trans through the pore and be held in an extended conformation by the current flow. The single strand DNA exonucleases or single strand DNA dependent polymerases can act as molecular motors to pull the recently translocated single strand back through the pore in a controlled stepwise manner, trans to cis, against the applied potential. Alternatively, the single strand DNA dependent polymerases can act as molecular brake slowing down the movement of a polynucleotide through the pore. Any moieties, techniques or enzymes described in WO-2012/107778 or WO-2012/033524 could be used to control polymer motion.

However, the measurement system 2 may be of alternative types that comprise one or more nanopores.

Similarly, the measurements may be of types other than measurements of ion current. Some examples of alternative types of measurement include without limitation: electrical measurements and optical measurements. A suitable optical method involving the measurement of fluorescence is disclosed by J. Am. Chem. Soc. 2009, 131 1652-1653. Possible electrical measurements include: current measurements, impedance measurements, tunnelling measurements (for example as disclosed in Ivanov A P et al., Nano Lett. 2011 Jan. 12; 11(1):279-85), and FET measurements (for example as disclosed in WO2005/124888). Optical measurements may be combined with electrical measurements (Soni G V et al., Rev Sci Instrum. 2010 January; 81(1):014301). The measurement may be a transmembrane current measurement such as measurement of ion current flow through a nanopore. The ion current may typically be the DC ion current, although in principle an alternative is to use the AC current flow (i.e. the magnitude of the AC current flowing under application of an AC voltage).

Herein, the term 'k-mer' refers to a group of k-polymer units, where k is a positive plural integer. In many measurement systems, measurements may be dependent on a portion of the polymer that is longer than a single polymer unit, for example a k-mer although the length of the k-mer on which measurements are dependent may be unknown. In many cases, the measurements produced by k-mers or portions of the polymer having different identities are not resolvable.

In many types of the measurement system 2, the series of measurements may be characterised as comprising measurements from a series of events, where each event provides a group of measurements. The group of measurements from each event have a level that is similar, although subject to some variance. This may be thought of as a noisy step wave with each step corresponding to an event.

The events may have biochemical significance, for example arising from a given state or interaction of the measurement system 2. For example, in some instances, the event may correspond to interaction of a particular portion of the polymer or k-mer with the nanopore, in which case the group of measurements is dependent on the same portion of the polymer or k-mer. This may in some instances arise from translocation of the polymer through the nanopore occurring in a ratcheted manner.

Within the limits of the sampling rate of the measurements and the noise on the signal, the transitions between states can be considered instantaneous, thus the signal can be approximated by an idealised step trace. However when translocation rates approach the measurement sampling rate, for example, measurements are taken at 1 times, 2 times, 5 times or 10 times the translocation rate of a polymer unit, this approximation may not be as applicable as it was for slower sequencing speeds or faster sampling rates.

In addition, typically there is no a priori knowledge of number of measurements in the group, which varies unpredictably.

These two factors of variance and lack of knowledge of the number of measurements can make it hard to distinguish some of the groups, for example where the group is short and/or the levels of the measurements of two successive groups are close to one another.

The group of measurements corresponding to each event typically has a level that is consistent over the time scale of the event, but for most types of the measurement system 2 will be subject to variance over a short time scale.

Such variance can result from measurement noise, for example arising from the electrical circuits and signal processing, notably from the amplifier in the particular case of electrophysiology. Such measurement noise is inevitable due the small magnitude of the properties being measured.

Such variance can also result from inherent variation or spread in the underlying physical or biological system of the measurement system 2, for example a change in interaction, which might be caused by a conformational change of the polymer.

Most types of the measurement system 2 will experience such inherent variation to greater or lesser extents. For any given types of the measurement system 2, both sources of variation may contribute or one of these noise sources may be dominant.

With increase in the sequencing rate, being the rate at which polymer units translocate with respect to the nanopore, then the events may become less pronounced and hence harder to identify, or may disappear. Thus, analysis methods that rely on event detection may become less efficient at as the sequencing rate increases.

Increasing the measurement sampling rate may compensate for difficulties in measuring transitions but such faster sampling typically comes with a penalty in signal-to-noise.

The methods described below are effective even at relatively high sequencing rates, including sequencing rates at which the series of measurements are a series of measurements taken at a rate of at least 10 polymer units per second, preferably 100 polymer units per second, more preferably 500 polymer units per second, or more preferably 1000 polymer units per second.

The analysis system 3 will now be considered.

Herein, reference is made to posterior probability vectors and matrices that represent "posterior probabilities" of different sequences of polymer units or of different changes to sequences of polymer units. The values of the posterior probability vectors and matrices may be actual probabilities (i.e. values that sum to one) or may be weights or weighting factors which are not actual probabilities but nonetheless represent the posterior probabilities. Generally, where the values of the posterior probability vectors and matrices are expressed as weights or weighting factors, the probabilities could in principle be determined therefrom, taking account of the normalisation of the weights or weighting factors. Such a determination may consider plural time-steps. By way of non-limitative example, two methods are described below, referred to as local normalisation and global normalisation.

Similarly, reference is made to scores representing the probability of the series of polymer units that are measured being reference series of polymer units. In the same way, the value of the score may be an actual probability or may be a weight that is not an actual probability but nonetheless represents the probability of the series of polymer units that are measured being reference series of polymer units.

The analysis system 3 may be physically associated with the measurement system 2, and may also provide control signals to the measurement system 2. In that case, the nanopore measurement and analysis system 1 comprising the measurement system 2 and the analysis system 3 may be arranged as disclosed in any of WO-2008/102210, WO-2009/07734, WO-2010/122293, WO-2011/067559 or WO2014/04443.

Alternatively, the analysis system 3 may implemented in a separate apparatus, in which case the series of measurement is transferred from the measurement system 2 to the analysis system 3 by any suitable means, typically a data network. For example, one convenient cloud-based implementation is for the analysis system 3 to be a server to which the input signal 11 is supplied over the internet.

The analysis system 3 may be implemented by a computer apparatus executing a computer program or may be implemented by a dedicated hardware device, or any combination thereof. In either case, the data used by the method is stored in a memory in the analysis system 3.

In the case of a computer apparatus executing a computer program, the computer apparatus may be any type of computer system but is typically of conventional construction. The computer program may be written in any suitable programming language. The computer program may be stored on a computer-readable storage medium, which may be of any type, for example: a recording medium which is insertable into a drive of the computing system and which may store information magnetically, optically or opto-magnetically; a fixed recording medium of the computer system such as a hard drive; or a computer memory.

In the case of the computer apparatus being implemented by a dedicated hardware device, then any suitable type of device may be used, for example an FPGA (field programmable gate array) or an ASIC (application specific integrated circuit).

A method of using the nanopore measurement and analysis system 1 is performed as follows.

Firstly, the series of measurements are taken using the measurement system 2. For example, the polymer is caused to translocate with respect to the pore, for example through the pore, and the series of measurements are taken during the translocation of the polymer. The polymer may be caused to translocate with respect to the pore by providing conditions that permit the translocation of the polymer, whereupon the translocation may occur spontaneously.

Secondly, the analysis system 3 performs a method of analysing the series of measurements as will now be described. There will first be described a basic method, and then some modifications to the basic method.

The basic method analyses the series of measurements using a machine learning technique, which in this example is a recurrent neural network. The parameters of the recurrent neural network take values during the training that is described further below, and as such the recurrent neural network is not dependent on the measurements having any particular form or the measurement system 2 having any particular property. For example, the recurrent neural network is not dependent on the measurements being dependent on k-mers.

The basic method uses event detection as follows.

The basic method processes the input as a sequence of events that have already been determined from the measurements (raw signal) from the measurement system 2. Thus, the method comprises initial steps of identifying groups of consecutive measurements in the series of measurements as belonging to a common event, and deriving a feature vector comprising one or more feature quantities from each identified group of measurements, as follows.

The segmentation of the raw samples into events uses the same method as described in WO 2015/140535, although it not thought that the basic method is sensitive to the exact method of segmentation.

Figure 2:
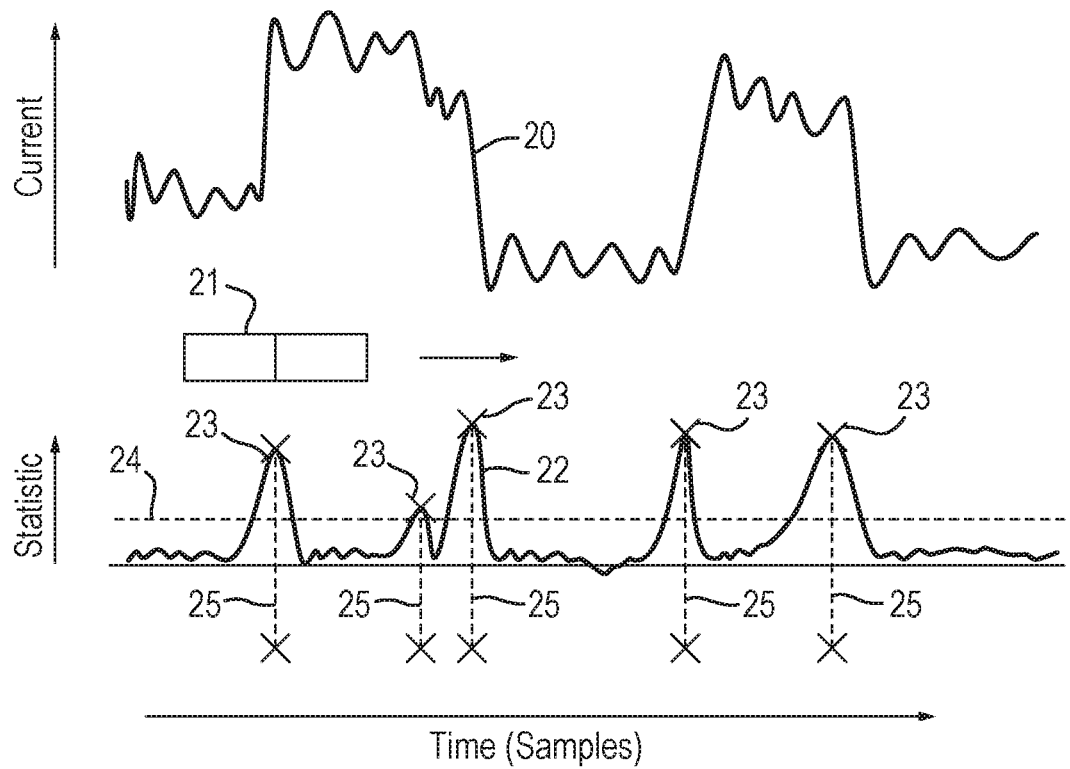
FIG. 2 is a representation of a segmentation process used to find the boundaries of the events that are input into an analysis system.

However, for completeness, an outline of a segmentation process that may be applied is described as follows with reference to FIG. 2. FIG. 2 shows the a graph of the raw signal 20 which comprises the series of measurements, having with step-like 'event' behaviour, a sliding pair of windows 22, a sequence of pairwise t-statistics 23 calculated from the raw signal 20, showing localized peaks, and a threshold 24 (dashed line), and a set of event boundaries 25 corresponding to the peaks.

Groups of consecutive measurements are identified as belonging to a common event as follows. The consecutive pair of windows 21 are slid across the raw signal 20 and the pairwise t-statistic of whether the samples (measurements) in one window 21 have a different mean to the other is calculated at each position, giving the sequences of statistics 23. A thresholding technique against the threshold 24 is used to localise the peaks 23 in the sequence of statistics 23 that correspond to significant differences in level of the original raw signal 20, which are deemed to be event boundaries 25, and then the location of the peaks 23 is determined using a standard peak finding routine, thereby identifying the events in the series of measurements of the raw signal 20.

Each event is summarised by deriving, from each identified group of measurements, a set of one or more feature quantities that describe its basic properties. An example of three feature quantities that may be used are as follows and are shown diagrammatically in FIG. 3:

Level L: a measure of the average current for the event, generally the mean but could be a median or related statistics.

Variation V: how far samples move away from the central level, generally the standard deviation or variance of the event. Other alternatives include the Median Absolute Deviation or the mean deviation from the median.

Length (or dwell) D: How long the event is, either as a number of samples or in seconds.

In general, any one or more feature quantities may be derived and used. The one or more feature quantities comprise a feature vector.

As with any analysis of a noisy process, the segmentation may make mistakes. Event boundaries may be missed, resulting in events containing multiple levels, or additional boundaries may be created where none should exist. Oversegmentation, choosing an increase in false boundaries over missing real boundaries, has been found to result in better basecalls.

The feature vector comprising one or more feature quantities are operated on by the recurrent neural network as follows.

The basic input to the basic method is a time-ordered set of feature vectors corresponding to events found during segmentation. As is standard practice with most machine learning procedures, the input features are normalised to help stabilise and accelerate the training process but the basic method has two noticeable differences: firstly, because of the presence of significant outlier events, Studentisation (centre by mean and scale by standard deviation) is used rather than the more common min-max scaling; a second, more major change, is that that scaling happens on a per-read basis rather than the scaling parameters being calculated over all the training data and then fixed.

Other alternatives to min-max scaling, designed to be robust to extreme values, may also be applied. Examples of such a method would be a min-max scaling whose parameters are determined after trimming the lowest and highest x % of values, or scaling based on the median and median absolute deviation.

The reason for this deviation from the standard training protocol is to help the network generalise to the variation across devices that will be encountered in the field. While the number of reads that can be trained from is extremely large, time and cost considerations mean that they will have come from a small number of devices and so the training run conditions represent a small section of those that might be encountered externally. Per-read normalisation helps the network generalise, although there is a potential loss in accuracy.

A fourth 'delta' feature, derived from the others, is also used as input to the basic method, intended to represent how different neighbouring events are from each other and so indicate whether there is a genuine change of level or whether the segmentation was incorrect. The exact description of the delta feature has varied between different implementations of the basic method, and a few are listed below, but the intention of the feature remains the same.

Absolute difference in levels, followed by normalisation.

Squared difference in levels, followed by normalisation.

Difference in levels, followed by partial normalisation (scaled but not centred).

The basic method uses a deep neural network consisting of multiple bidirectional recurrent layers with sub-sampling. An overview of the architecture of a recurrent neural network 30 that may be implemented in the analysis system 3 is shown in FIG. 4 and arranged as follows, highlighting many of the features that differentiate from an analysis performed using an HMM.

In overview, the recurrent neural network 30 comprises: a windowing layer 32 that performs windowing over the input events; a bidirectional recurrent layers 34 that process their input iteratively in both forwards and backwards directions; feed-forward layers 35 that may be configured as a subsampling layer to reduce dimensionality of the recurrent neural network 30; and a softmax layer 36 that performs normalization using a softmax process to produce output interpretable as a probability distribution over symbols. The analysis system 3 further includes a decoder 37 to which the output of the recurrent neural network 30 is fed and which performs a subsequent decoding step.

In particular, the recurrent neural network 30 receives the input feature vectors 31 and passes them through the windowing layer 32 which windows the input feature vectors 31 to derive windowed feature vectors 33. The windowed feature vectors 33 are supplied to the stack of plural bidirectional recurrent layers 34. Thus, the influence of each input event is propagated throughout all steps of the model represented in the recurrent neural network 30 at least twice with the second pass informed by the first. This double bidirectional architecture allows the recurrent neural network 30 to accumulate and propagate information in a manner unavailable to HMMs. One consequence of this is that the recurrent neural network 30 doesn't require an iterative procedure to scale the model to the read.

Two bidirectional recurrent layers 34 are illustrated in this example, differentiated as 34-1 and 34-2 and each followed by a feed-forward layer 35, differentiated as 35-1 and 35-2, but in general there may be any plural number of bidirectional recurrent layers 34 and subsequent feed-forward layers 35.

The output of the final feed-forward layer 35-2 is supplied to the softmax layer 36 which produces outputs representing posterior probabilities that are supplied to the decoder 37. The nature of these posterior probabilities and processing by the decoder 37 are described in more detail below.

Figure 5:
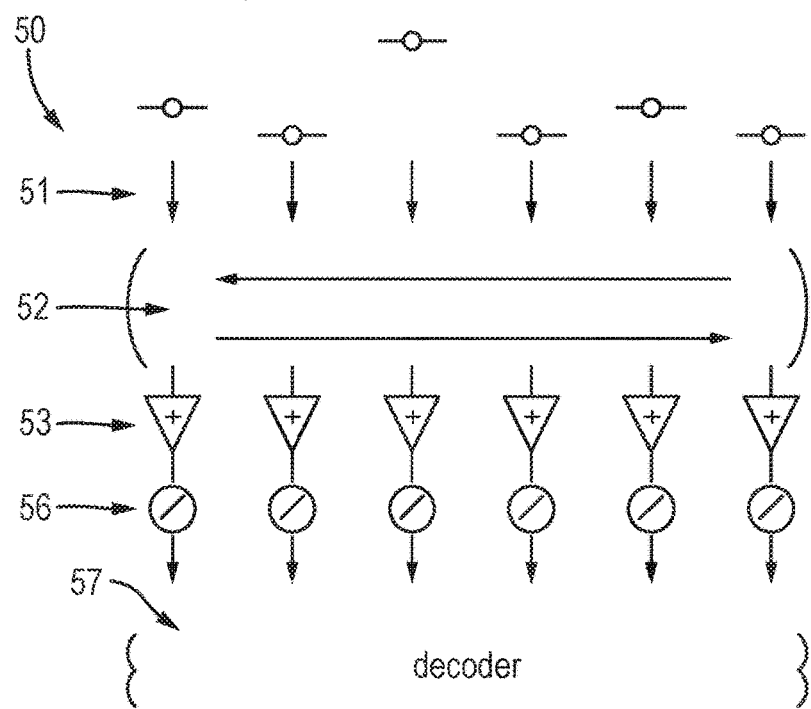
FIG. 5 is a schematic diagram illustrating the structure of an comparative example of an analysis system employing an HMM (Hidden Markov Model) architecture.

By way of comparison, a HMM 50 can be described in a form similar to a neural network, as shown in FIG. 5. The HMM 50 includes inputs single events, with no windowing and no delta feature and comprises: a forwards-backwards layer 54 into which the feature vectors 51 are fed and which performs forwards and backwards passes of the network with tightly coupled parameters; an additive combination layer 55 into which the output of the forwards-backwards layer 54 is fed and which performs subsampling by element-wise addition of the output of the forward and backward passes; a normalisation layer 56 that performs normalization to produce out-put interpretable as a probability distribution over symbols; and a decoder 57 that performs a subsequent decoding step.

Due to their assumption that the emission of the HMM 50 is completely described by the hidden state, the HMM 50 cannot accept windowed input and nor can they accept delta-like features since the input for any one event is assumed to be statistical independent from another given knowledge of the hidden state (although optionally this assumption may be relaxed by use of an extension such as an autoregressive HMM). Rather than just applying the Viterbi algorithm directly to decode the most-likely sequence of states, the HMM for the nanopore sequence estimation problem proceeds via the classical forwards/backwards algorithm in the forwards-backwards layer 52 to calculate the posterior probability of the each hidden label for each event and then an addition Viterbi-like decoding step in the decoder 57 determines the hidden states. This methodology has been referred to as posterior-Viterbi in the literature and tends to result in estimated sequences where a greater proportion of the states are correctly assigned, compared to Viterbi, but still form a consistent path.

Table 1 summarizes the key differences between how the comparable layers are used in this and in the basic method, to provide a comparison of similar layers types in the architecture of the HMM 50 and the basic method, thereby highlighting the increased flexibility given by the neural network layers used in the basic method.

TABLE 1

| Element | HMM 30 | Basic method implemented in recurrent neural network 30 |
| --- | --- | --- |
| Windowing layer 32 | Only a single event is permitted as input and features are assumed to be statistically dependent from event to event. | A window of features can be used as input including features that are dependent on other events, or even globally on all events. |
| Bidirectional recurrent layers 34 | Parameters for the forwards-backwards layer 52 are tightly coupled and the type of unit is defined by the statistical model. The size of the forwards and backwards must be the same as the number of symbols to be output. | Flexible choice of unit architecture. The forwards and backwards units may have different parameters, but difference sizes or even be composed of different unit types. |
| Subsampling in feed-forward layers 35 | The output vectors for the forward-backwards layer 52 at each column are summed in the normalisation layer 56 to create a single vector which has the same size as the units in the forwards-backwards layer 52 (i.e. the number of symbols). | Separate affine transforms are applied to the output vectors for the forward and backwards layer at each column, followed by summation; this is equivalent to applying an affine transform to the vector formed by concatenation of the input and output. An activation function is then applied element-wise to the resultant matrix. |
| Normalisation in softmax layer 36 | Normalisation in the normalization layer 56 is performed by applying the 'softmax' functor, that is the same as the 'softmax' unit 36 described herein but without an affine transform, to each column of the output. | The 'softmax' functor is applied to each column after applying a general affine transform to project the input vector into a space with dimension equal to the number of possible output symbols. |

While there are the same number of columns output as there are events, it is not correct to assume that each column is identified with a single event in the input to the network since its contents are potentially informed by the entire input set of events because of the presence of the bidirectional layers. Any correspondence between input events and output columns is through how they are labelled with symbols in the training set.

The bidirectional recurrent layers 34 of the recurrent neural network 30 may use several types of neural network unit as will now be described. The types of unit fall into two general categories depending on whether or not they are 'recurrent'. Whereas non-recurrent units treat each step in the sequence independently, a recurrent unit is designed to be used in a sequence and pass a state vector from one step to the next. In order to show diagrammatically the difference between non-recurrent units and recurrent units, FIG. 6 shows a non-recurrent layer 60 of non-recurrent units 61 and FIGS. 7 to 9 show three different layers 62 to 64 of respective non-recurrent units 64 to 66. In each of FIGS. 6 to 9, the arrows show connections along which vectors are passed, arrows that are split being duplicated vectors and arrows which are combined being concatenated vectors.

In the non-recurrent layer 60 of FIG. 6, the non-recurrent units 61 have separate inputs and outputs which do not split or concatenate.

The recurrent layer 62 of FIG. 7 is a unidirectional recurrent layer in which the output vectors of the recurrent units 65 are split and passed to unidirectionally to the next recurrent unit 65 in the recurrent layer.

While not a discrete unit in its own right, the bidirectional recurrent layers 63 and 64 of FIGS. 8 and 9 each have a repeating unit-like structure made from simpler recurrent units 66 and 67, respectively.

In the bidirectional recurrent layer of FIG. 8, the bidirectional recurrent layer 63 consists of two sub-layers 68 and 69 of recurrent units 66, being a forwards sub-layer 68 having the same structure as the unidirectional recurrent layer 62 of FIG. 7 and a backward sub-layer 69 having a structure that is reversed from the unidirectional recurrent layer 62 of FIG. 7 as though time were reversed, passing state vectors from one unit 66 to the previous unit 66. Both the forwards and backwards sub-layers 68 and 69 receive the same input and their outputs from corresponding units 66 are concatenated together to form the output of the bidirectional recurrent layer 63. It is noted that there are no connections between any unit 66 within the forwards sub-layer 68 and any unit within the backwards sub-layer 69.

The alternative bidirectional recurrent layer 64 of FIG. 9 similarly consists of two sub-layers 70 and 71 of recurrent units 67, being a forwards sub-layer 68 having the same structure as the unidirectional recurrent layer 62 of FIG. 7 and a backwards sub-layer 69 having a structure that is reversed from the unidirectional recurrent layer 62 of FIG. 7 as though time were reversed. Again the forwards and backwards sub-layers 68 and 69 receive the same inputs, However, in contrast to the bidirectional recurrent layer of FIG. 8, the outputs of forwards sub-layer 68 are the inputs of the backwards sub-layer 69 and the outputs of the backwards sub-layer 69 form the output of the bidirectional recurrent layer 64 (the forwards and backwards sub-layers 68 and 69 could be reversed).

A generalisation of the bidirectional recurrent layer shown in FIG. 9 would be a stack of recurrent layers consisting of plural 'forwards' and 'backward' recurrent sub-layers, where the output of each layer is the input for the next layer.

Figure 3:
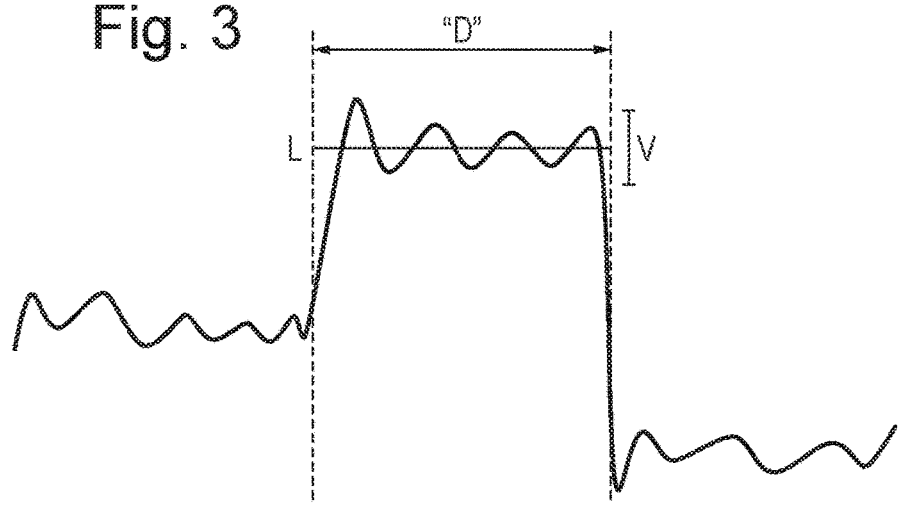
FIG. 3 is a graph of the raw signal illustrating the relationship to example quantities that are summary statistics of an identified event.

The bidirectional recurrent layers 34 of FIG. 3 may take the form of either of the bidirectional recurrent layers 63 and 64 of FIGS. 8 and 9. In general, the bidirectional recurrent layers 34 of FIG. 3 could be replaced by a non-recurrent layer, for example the non-recurrent layer 60 of FIG. 6, or by a unidirectional recurrent layer, for example the recurrent layer 62 of FIG. 7, but improved performance is achieved by use of bidirectional recurrent layers 34.

The feed-forward layers 35 will now be described.

The feed-forward layers 35 comprise feed-forward units 38 that process respective vectors. The feed-forward units 38 are the standard unit in classical neural networks, that is an affine transform is applied to the input vector and then a non-linear function is applied element-wise. The feed-forward layers 35 all use the hyperbolic tangent for the non-linear function, although many others may be used with little variation in the overall accuracy of the network.

If the input vector at step t is $I_t$, and the weight matrix and bias for the affine transform are A and b respectively, then the output vector $O_t$ is:

$y_t = AI_t + b$ Affine transform
$O_t\ \tanh(y_t)$ Non-linearity

The output of the final feed-forward layer 35 is fed to the softmax layer 36 that comprises softmax units 39 that process respective vectors.

The purpose of the softmax units 39 is to turn an input vector into something that is interpretable as a probability distribution over output symbols, there being a 1:1 association with elements of the output vector and symbols. An affine transformation is applied to the input vector, which is then exponentiated element-wise and normalised so that the sum of all its elements is one. The exponentiation guarantees that all entries are positive and so the normalisation creates a valid probability distribution.

If the input vector at step t is $I_t$, and the weight matrix and bias for the affine transform are A and b respectively, then the output vector $O_t$ is:

$y_t = AI_t + b$ Affine transform
$z_t = e^{y_t}$ Exponentiation
$O_t = z_t / 1'z_t$ Normalisation where 1' is the transpose of the vector whose elements are all equal to the unit value, so 1'x is simply the (scalar) sum of all the elements of x.

Use of the softmax layer 36 locally normalises the network's output at each time-step. Alternatively, the recurrent neural net 30 may be normalised globally across over all time steps so that the sum over all possible output sequences is one. Global normalisation is strictly more expressive than local normalisation and avoids an issue known in the art as the 'label bias problem'.

The advantages of using global normalisation over local normalisation are analogous to those that Conditional Random Fields (Lafferty et al., Conditional Random Fields: Probabilistic Models for Segmenting and Labeling Sequence Data, Proceedings of the International Conference on Machine Learning, June 2001) have over Maximum Entropy Markov Models (McCallum et al., Maximum Entropy Markov Models for Information Extraction and Segmentation, Proceedings of ICML 2000, 591-598. Stanford, California, 2000). The label bias problem affects models in which the matrix of allowed transitions between states is sparse, such as extensions to polymer sequences.

With local normalisation, the transition probabilities for each source state will be normalised to one, which causes states that have the fewest feasible transitions to receive high scores, even if they are a poor fit to the data. This creates a bias towards selecting states with a small number of feasible transitions.

Global normalisation alleviates this problem by normalising over the entire sequence, allowing transitions at different times to be traded against each other. Global normalisation is particularly advantageous for avoiding biased estimates of homopolymers and other low complexity sequences, as these sequences may have different numbers of allowed transitions compared to other sequences (it may be more or fewer, depending on the model).

The non-recurrent units 62 and recurrent units 65 to 67 treat each event independently, but may be replaced by Long Short-Term Memory units having a form as will now be described.

Long Short-Term Memory (LSTM) units were introduced in Hochreiter and Schmidhuber, Long short-term memory, Neural Computation, 9 (8): 1735-1780, 1997. An LSTM unit is a recurrent unit and so passes a state vector from one step in the sequence to the next. The LSTM is based around the notation that the unit is a memory cell: a hidden state containing the contents of the memory is passed from one step to the next and operated on via a series of gates that control how the memory is updated. One gate controls whether each element of the memory is wiped (forgotten), another controls whether it is replaced by a new value, and a final gate that determines whether the memory is read from and output. What makes the memory cell differentiable is that the binary on/off logic gates of the conceptual computer memory cell are replaced by notional probabilities produced by a sigmoidal function and the contents of the memory cells represent an expected value.

Firstly the standard implementation of the LSTM is described and then the 'peep-hole' modification that is actually used in the basic method.

The standard LSTM is as follows.

The probabilities associated with the different operations on the LSTM units are defined by the following set of equations. Letting $I_t$ be input vector for step t, $O_t$ be the output vector and let the affine transform indexed by x that has bias $b_x$ and weight matrices $W_{xI}$ and $W_{xO}$ for the input and previous output respectively; σ is the non-linear sigmoidal transformation.

$f_t = \sigma(W_{fI}I_t + W_{fO}O_{t-1} + b_f)$ Forget probability
$u_t = \sigma(W_{uI}I_t + W_{uO}O_{t-1} + b_u)$ Update probability
$o_t = \sigma(W_{oI}I_t + W_{oO}O_{t-1} + b_o)$ Output probability Given the update vectors defined above and letting the ∘ operator represent element-wise (Hadamard) multiplication, the equations to update the internal state $S_t$ and determine the new output are:

$v_t = \tanh(W_{vI}I_t + W_{vO}O_{t-1} + b_v)$ Value to update with
$S_t = S_{t-1} \circ f_t + v_t \circ u_t$ Update memory cell
$O_t = \tanh(s_t) \circ o_t$ Read from memory cell The peep-hole modification is as follows.

The 'peep-hole' modification (Gers and Schmidhuber, 2000) adds some additional connections to the LSTM architecture allowing the forget, update and output probabilities to 'peep at' (be informed by) the hidden state of the memory cell. The update equations for the network are as above but, letting $P_x$ be a 'peep' vector of length equal to the hidden state, the three equations for the probability vectors become:

$f_t = \sigma(W_{fI}I_t + W_{fO}O_{t-1} + b_f + P_f \circ S_{t-1})$ Forget probability
$u_t = \sigma(W_{uI}I_t + W_{uO}O_{t-1} + b_u + P_u \circ S_{t-1})$ Update probability
$o_t = \sigma(W_{oI}I_t + W_{oO}O_{t-1} + b_o + P_o \circ S_t)$ Output probability The non-recurrent units 62 and recurrent units 65 to 67 may alternatively be replaced by Gated Recurrent Units having a form as follows.

The Gated Recurrent Unit (GRU) has been found to be quicker to run but initially found to yield poorer accuracy. The architecture of the GRU is not as intuitive as the LSTM, dispensing with the separation between the hidden state and the output and also combining the 'forget' and 'input gates'.

$o_t = \sigma(W_{oI}I_t + W_{oS}S_{t-1} + b_o)$ Output probability
$u_t = S_{t-1} \circ \sigma(W_{uI}I_t + W_{uS}S_{t-1} + b_u)$ Update from state
$v_t = \tanh(W_{vI}I_t + W_{vR}u_t + b_v)$ Value to update with
$S_t = (1-o_t) \circ S_{t-1} + o_t \circ v_t$ Update state A HMM can be described as a neural unit as follows.

Although not used in the basic method, for completeness here is described how the forwards (backwards) HMM algorithm can be described using the recurrent neural network framework. A form whose output is in log-space is presented. A HMM is described by its transition matrix T and log density function δ parameterized by μ. The log-density function takes the input features and returns a vector of the log-probabilities of those features conditioned on the hidden state, the exact form of the function being specified by the parameters μ.

$o_t = \delta(I_t;\mu)$ Log density function
$e_t = \exp(S_{t-1})$ Exponentiate
$f_t = T'e_t$ Transition
$S_t = o_t + \log f_t$ Update state As explained above, the recurrent neural network 30 produces outputs representing posterior probabilities that are supplied to a decoder 37. In the basic method the outputs are plural posterior probability vectors, each representing posterior probabilities of plural different sequences of polymer units. Each plural posterior probability vector corresponds to respective identified groups of measurements (events).

The decoder 37 derives an estimate of the series of polymer units from the posterior probability vectors, as follows.

The plural posterior probability vectors may be considered as a matrix with a column for each step, each column being a probability distribution over a set of symbols representing k-mers of predetermined length and an optional extra symbol to represent bad data (see 'Bad events as handled as follows' below). Since k-mers for neighbouring steps will overlap, a simple decoding process such as 'argmax', picking the k-mer that has the maximal probability at each step, and concatenating the result will result in a poor estimate of the underlying template DNA sequence. Good methods, the Viterbi algorithm for example, exist for finding the sequence of states that maximises the total score subject to restrictions on types of state-to-state transition that may occur.

If plural posterior probability vectors is the matrix, where the probability assigned to state j at step t is $p_{tj}$, and there is set of transition weights $\tau_{i \to j}$ for moving from state i to state j, then the Viterbi algorithm finds the sequence of states that maximises the score $$L(s_1 \ldots s_T) = \log p_{1s_1} + \sum_{t=2}^{T} \tau_{s_{t-1} \to s_t} + \log p_{ts_t}$$

The Viterbi algorithm first proceeds in an iterative fashion from the start to end of the network output. The element $f_{ij}$ of the forwards matrix represents the score of the best sequence of states up to step i ending in state j; element bij of the backwards matrix stores the previous state given that step i is in state j $f_{0s} = 0$
$f_{is} = \log p_{is} + \max_j \tau_{j \to s} + f_{i-1,j}$
$b_{is} = \mathrm{argmax}_j \tau_{j \to s} + f_{i-1,j}$ The best overall score can be determined by finding the maximal element of the final column T of the forward matrix; finding the sequence of states that achieves this score proceeds iteratively from the end to the start of the network output.

$s_T = \mathrm{argmax}_s f_{Ts}$
$s_i = b_{is_{i+1}}$

The transition weights define the allowed state-to-state transitions, a weight of negative infinity completely disallowing a transition and negative values being interpretable as a penalty that suppress that transition. The previously described 'argmax' decoding is equivalent to setting all the transition weights to zero. Where there are many disallowed transitions, a substantial runtime improvement can be obtained by performing the calculation in a sparse manner so only the allowed transitions are considered.

Having applied the Viterbi algorithm, each column output (posterior probability vector) by the network is labelled by a state representing a k-mer and this set of states is consistent. The estimate of the template DNA sequence is formed by maximal overlap of the sequence of k-mers that the symbols represent, the transition weights having ensured that the overlap is consistent. Maximal overlap is sufficient to determine the fragment of the estimated DNA sequence but there are cases, homopolymers or repeated dimers for example, where the overlap is ambiguous and prior information must be used to disambiguate the possibilities. For our present nanopore device, the event detection is parametrised to over-segment the input and so the most likely overlap in ambiguous cases is the most complete.

Bad events are handled as follows.

The basic method emits on an alphabet that contains an additional symbol trained to mark bad events that are considered uninformative for basecalling. Events are marked as bad, using a process such as determining whether the 'bad' symbol is the one with the highest probability assigned to it or by a threshold on the probability assigned, and the corresponding column is removed from the output. The bad symbol is removed from the remaining columns and then they are individually renormalised so as to form a probability distribution over the remaining symbols. Decoding then proceeds as described above.

The recurrent neural network is trained for a particular type of measurement system 2 using techniques that are conventional in themselves and using training data in the form of series of measurements for known polymers.

Some modifications to the basic method will now be described.

The first modification relates to omission of event calling. Having to explicitly segment the signal into events causes many problems with base calling: events are missed or over called due to incorrect segmentation, the type of event boundaries that can be detected depends on the filter that has been specified, the form of the summary statistics to represent each event are specified up-front and information about the uncertainty of the event call is not propagated into the network. As the speed of sequencing increases, the notion of an event with a single level becomes unsound, the signal blurring with many samples straddling more than one level due the use of an integrating amplifier, and so a different methodology may be used to find alternative informative features from the raw signal.

Hence, the first modification is to omit event calling and instead perform a convolution of consecutive measurements in successive windows of the series of measurements to derive a feature vector in respect of each window, irrespective of any events that may be evident in the series of measurements. The recurrent neural network then operates on the feature vectors using said machine learning technique.

Thus, windows of measurements of fixed length, possibly overlapping, are processed into feature vectors comprising plural feature quantities that are then combined by a recurrent neural network and associated decoder to produce an estimate of the polymer sequence. As a consequence, the output posterior probability matrices corresponding to respective measurements or respective groups of a predetermined number of measurements depend on the degree of down-sampling in the network.

FIG. 10 shows an example of the first modification. In particular, FIG. 10 shows graph of the raw signal 20 which comprises the series of measurements, and an input stage 80 that may be arranged in front of the recurrent neural network 30 described above.

The input stage 80 feeds measurements in overlapping windows 81 into feature detector units 82. Thus, the raw signal 20 is processed in fixed length windows by the feature detector units 82 to produce the feature vector of features for each window, the features taking the same form as described above. The same feature detection unit is used for every window. The sequence of feature vectors produced is fed sequentially into the recurrent neural network 30 arranged as described above to produce a sequence estimate.

The feature detector units 82 are trained together with the recurrent neural network 30.

An example of a feature detector implemented in the feature detector units 82 is a single layer convolutional neural network, defined by an affine transform with weights W and bias b, and an activation function g. Here $I_{t-j:t \to k}$ represents a window of measurements of the raw signal 20 containing the t−j to the t+k measurements inclusive, and $O_t$ is the output feature vector.

$y_t = AI_{t-j:t \to k} + b$ Affine transform $O_t = g(y_t)$ Activation

The hyperbolic tangent is a suitable activation function but many more alternatives are known in the art, including but not restricted to: the Rectifying Linear Unit (ReLU), Exponential Linear Unit (ELU), softplus unit, and sigmoidal unit. Multi-layer neural networks may also be used as feature detectors.

A straight convolutional network, as described, has the disadvantage that there is a dependence on the exact position of detected features in the raw signal and this also implies a dependence on the spacing between the features. The dependence can be alleviated by using the output sequence of feature vectors generated by the first convolution as input into a second 'pooling' network that acts on the order statistics of its input.

By way of example, where the pooling network is a single layer neural network, the following equations describe how the output relates to the input vectors. Letting f be an index over input features, so $A_f$ is the weight matrix for feature f, and let S be a functor that returns some or all of the order statistics of its input:

$$y_t = b + \sum_f A_f S(I_{f,t-j:t+k}) \quad \text{Affine transform}$$

$O_t = g(y_t)$ Activation

One useful yet computationally efficient example of such a layer is that which returns a feature vector, the same size as the number of input features, whose elements are the maximum value obtained for each respective feature. Letting the functor $S_M$ return only the last order statistic, being the maximum value obtained in its input, and letting $U_f$ be the (single column) matrix that consists entirely of zeros other than a unit value at its (f,1) element:

$$y_t = \sum_f U_f S_M(I_{f,t-j:t+k}) \quad \text{Affine transform}$$

$O_t = y_t$ No activation applied

Since the matrices $U_f$ are extremely sparse, for reasons of computation efficiency, the matrix multiplications may be performed implicitly: here effect of $\Sigma_f U_f x_f$ is to set element f of the output feature vector to $x_f$.

The convolutions and/or pooling may be performed only calculating their output for every nth position (a stride of n) and so down-sampling their output. Down-sampling can be advantageous from a computational perspective since the rest of the network has to process fewer blocks (faster compute) to achieve a similar accuracy.

Adding a stack of convolution layers solves many of the problems described above: the feature detection learned by the convolution can function both as nanopore-specific feature detectors and summary statistics without making any additional assumptions about the system; feature uncertainty is passed down into the rest of the network by relative weights of different features and so further processing can take this information into account leading to more precise predictions and quantification of uncertainty.

The second modification relates to the output of the recurrent neural network 30, and may optionally be combined with the first modification.

A possible problem for decoding the output of the basic method implemented in the recurrent neural network 30 is that, once the highest-scoring path through the k-mers has been determined, the estimate of the polymer sequence still has be determined by overlap and this process can be ambiguous.

To highlight the problem, consider the case where the history of the process is moving through a homopolymer region: all overlaps between the two k-mers are possible and several are feasible, corresponding to an additional sequence fragment of zero, one or two bases long for example. A strategy that relies on k-mers only partially solves the sequence estimation problem.

Thus, the second modification is to modify the outputs of the recurrent neural network 30 representing posterior probabilities that are supplied to the decoder 37. In particular, the ambiguity is resolved by dropping the assumption of decoding into k-mers and so not outputting posterior probability vectors that represent posterior probabilities of plural different sequences of polymer units. Instead, there is output posterior probability matrices, each representing, in respect of different respective historical sequences of polymer units corresponding to measurements prior or subsequent to the respective measurement, posterior probabilities of plural different changes to the respective historical sequence of polymer units giving rise to a new sequence of polymer units, as will now be described.

The historical sequences of polymer units are possible identities for the sequences that are historic to the sequence presently being estimated, and the new sequence of polymer units is the possible identity for the sequence that is presently being estimated for different possible changes to the historical sequence. Posterior probabilities for different changes from different historical sequences are derived, and so form a matrix with one dimension in a space representing all possible identities for the historical sequence and one dimension in a space representing all possible changes.

Notwithstanding the use of the term "historical", historical sequences of polymer units corresponding to measurements prior or subsequent to the respective measurement, as the processing is effectively reversible and may proceed in either direction along the polymer.

Possible changes that may be considered are:
changes that remove a single polymer unit from the beginning or end of the historical sequence of polymer units and a single polymer unit to the end or beginning of the historical sequence of polymer units.
changes that remove two or more polymer units from the beginning of the historical sequence of polymer units and add two or more polymer units to the end of the historical sequence of polymer units.
a null change.

This will now be considered in more detail.

The second modification will be referred to herein as implementing a "transducer" at the output stage of the recurrent neural network 30. In general terms, the input to the transducer at each step is a posterior probability matrix that contains values representing posterior probabilities, which values may be weights, each associated with moving from a particular history-state using a particular movement-state. A second, predetermined matrix specifies the destination history-state given the source history-state and movement-state. The decoding of the transducer implemented in the decoder 37 may therefore find the assignment of (history-state, movement-state) to each step that maximises the weights subject to the history-states being a consistent path, consistent defined by the matrix of allowed movements.

By way of illustration, FIG. 11 shows how the output of the recurrent neural network that is input to the decoder 36 may be generated in the form of a posterior probability matrices 40 from the feature vectors 31 that are input to the recurrent neural network 30. FIG. 12 illustrates an example of the result of decoding into a tuple of history-state 41 and movement-state 42 when the space of the history-state is 3-mers and the space of the movement-state 42 is sequence fragments. In particular, FIG. 12 illustrates four successive history-states 41 and movement-states 42 and it can be seen how the history state 41 changes in accordance with the change represented by the movement-state 42.

The second modification provides a benefit over the basic method because there are some cases where the history-states 41 (which is considered alone in the basic method) are ambiguous as to the series of polymer units, whereas the movement states 42 are not ambiguous. By way of illustration, FIG. 13 shows some sample cases where just considering the overlap between states on the highest scoring path, analogously to the basic method, results in an ambiguous estimate of the series of polymer units, whereas the sequence fragments of the movement-states 42 used in the second medication are not ambiguous The modification of the Viterbi algorithm that may be used for decoding is below but, for clarity, we first consider some concrete examples of how transducers may be used at the output of the softmax layer 56 and what their sets of history-states 41 and movement-states 42 might look like.

In one use of transducers, the set of history-states 41 is short sequence fragments of a fixed length and the movement-states are all sequence fragments up to a possible different fixed length, e.g. fragments of length three and up to two respectively means that the input to the decoding at each step is a weight matrix of size $4^3 \times (1+4+4^2)$. The history-states 41 are {AAA, AAC, . . . TTT} and the movement states 42 are {-, A, C, G, T, AA, . . . TT} where '-' represents the null sequence fragment. The matrix defining the destination history-state for a given pair of history-state and movement-state might look like:

|     | —   | A   | C   | G   | T   | AA  | ... |
| --- | --- | --- | --- | --- | --- | --- | --- |
| AAA | AAA | AAA | AAC | AAG | AAT | AAA |     |
| AAC | AAC | ACA | ACC | ACG | ACT | CAA |     |
| AAG | AAG | AGA | AGC | AGG | AGT | GAA |     |
| AAT | AAT | ATA | ATC | ATG | ATT | TAA |     |
| ACA | ACA | CAA | CAC | CAG | CAT | AAA |     |

Note that, from a particular history-state 41, there may be several movement-states 42 that give the same destination history-state. This is an expression of the ambiguity that knowledge of the movement-state 42 resolves and differentiates the transducer from something that is only defined on the set of history-states 41 or is defined on the tuple of (source-history-state, destination-history-state), being respectively a Moore machine and a Mealy machine in the parlance of finite-state machines. There is no requirement that the length of longest possible sequence fragment that could be emitted is shorter than the length of the history-state 41.

The posterior probability matrix input into the decoder 37 may be determined by smaller set of parameters, allowing the size of the history-state 41 to be relatively large for the same number of parameters while still allowing flexible emission of sequence fragments from which to assemble the final call.

One example that has proved useful is to have a single weight representing all transitions using the movement corresponding to the empty sequence fragment and all other transitions have a weight that depends solely on the destination history-state. For a history-state-space of fragments of length k and allowed output of up to two bases, this requires $4^k+1$ parameters rather than the $4^K \times 21$ of the complete explicit transducer defined above. Note that this form for transducer only partially resolves the ambiguity that transducers are designed to remove, still needing to make an assumption of maximal but not complete overlap in some cases since scores would be identical; this restriction is often sufficient in many cases that arise in practice when movement-states corresponding to sequence fragments longer than one would rarely be used.

The history-state of the transducer does not have to be over k-mers and could be over some other set of symbols. One example might where the information distinguishing particular bases, purines (A or G) or pyrimidines (C or T), is extremely local and it may advantageous to consider a longer history that cannot distinguish between some bases. For the same number of history-states, a transducer using an alphabet of only purines and pyrimidines could have strings twice as long since $4^k = 2^2k$. If P represents a purine Y a pyrimidine, the matrix defining the destination history-state for a given pair of history-state and movement-state would look like:

|     | —   | A   | C   | G   | T   | AA  | ... |
| --- | --- | --- | --- | --- | --- | --- | --- |
| PPP | PPP | PPP | PPY | PPP | PPY | PPP |     |
| PPY | PPY | PYP | PYY | PYP | PYY | YPP |     |
| PYP | PYP | YPP | YPY | YPP | YPY | PPP |     |
| PYY | PYY | YYP | YYY | YYP | YYY | YPP |     |

The history-state 41 of the transducer does not have to be identifiable with one or more fragments of historical sequence and it is advantageous to let the recurrent neural network 30 learn its own representation during training. Given a set of indexed history-states, $\{S_1, S_2, \ldots, S_H\}$ and a set of sequence fragments, the movement-states are all possible pairs of a history-state and a sequence fragment. By way of example, the set of sequence fragments may be $\{-, A, C, G, T, AA, \ldots TT\}$ and so the set of movement-states is $\{S_1-, S_1A, \ldots, S_1TT, S_2-, S_2A, \ldots, S_HTT\}$. The recurrent neural network 30 emits a posterior probability matrix over these history-states and movement-states as before, each entry representing the posterior probability for moving from one history-state to another by the emission of a particular sequence fragment.

The decoding that is performed by the decoder 37 in the second modification may be performed as follows. In a first application, the decoder may derive an estimate of the series of polymer units from the posterior probability matrices, for example by estimating the most likely path through the posterior probability matrices. The estimate may be an estimate of the series of polymer units as a whole. Details of the decoding are as follows.

Any method known in the art may be used in general, but it is advantageous to use a modification of the Viterbi algorithm to decode a sequence of weights for a transducer into a final sequence. As with the standard Viterbi decoding method, a trace-back matrix is built up during the forwards pass and this used to work out the path taken (assignment of history state to each step) that results in the highest possible score but the transducer modification also requires an additional matrix that records the movement-state actually used in transitioning from one history-state to another along the highest scoring path.

If the weight output by the recurrent neural network 30 at step i for the movement from history-state g via movement-state s is the tensor $\tau_{ihs}$ and the matrix $T_{gs}$ stores the destination history-state then the forwards iteration of the Viterbi algorithm becomes $$f_{0h} = 0 \qquad \text{Initialisation}$$

$$f_{ih} = \max_{s,g \text{ s.t. } T_{gs}=h} f_{i-1,g} + \log \tau_{igs} \qquad \text{Forwards update}$$

$$e_{ih} = \operatorname{argmax}_{s} \max_{g \text{ s.t. } T_{gs}=h} f_{i-1,g} + \log \tau_{igs} \qquad \text{Record movement}$$

$$b_{ih} = \operatorname{argmax}_{s \text{ s.t. } T_{gs}=h} \max f_{i-1,g} + \log \tau_{igs} \qquad \text{Trace- for history back}$$

The backwards 'decoding' iteration of the modified Viterbi proceeds step-wise from the end. Firstly the last history state for the highest scoring path is determined from the final score vector and then the trace-back information is used to determine all the history states on that path. Once the history-state $H_t$ at step t has been determined, the movement-state $M_t$ can be determined.

$H_T = \operatorname{argmax}_h f_{Th}$ $H_t = b_{t,H_{t+1}}$ $M_t = e_{t,H_t}$

Since each movement state has an interpretation as a sequence fragment, the estimate of the polymer sequence can be determined by concatenating these fragments. Since only the movement state is necessary for decoding, the sequence of history-states need never be explicitly determined.

In such a method, the estimation of the most likely path effectively finds as the estimate a series from all possible series that has the highest score representing the probability of the series of polymer units of the polymer being the reference series of polymer units, using the posterior probability matrices. This may be conceptually thought of as scoring against all possible series as references, although in practice the Viterbi algorithm avoids actually scoring every one. More generally, the decoder 37 be arranged to perform other types of analysis that similarly involve generation of a score in respect of one or reference series of polymer units, which score represents the probability of the series of polymer units of the polymer being the reference series of polymer units, using the posterior probability matrices. Such scoring enables several other applications, for example as follows. In the following applications, the reference series of polymer units may be stored in a memory. They may be series of polymer units of known polymers and/or derived from a library or derived experimentally.

In a first alternative, the decoder 36 may derive an estimate of the series of polymer units as a whole by selecting one of a set of plural reference series of polymer units to which the series of posterior probability matrices are most likely to correspond, for example based on scoring the posterior probability matrices against the reference series.

In a second alternative, the decoder 36 may derive an estimate of differences between the series of polymer units of the polymer and a reference series of polymer units. This may be done by scoring variations from the reference series. This effectively estimates the series of polymers from which measurements are taken by estimating the location and identity of differences from the reference. This type of application may be useful, for example, for identifying mutations in a polymer of a known type.

In a third alternative, the estimate may be an estimate of part of the series of polymer units. For example, it may be estimated whether part of the series of polymer units is a reference series of polymer units. This may be done by scoring the reference series against parts of the series of series of posterior probability matrices, for example using a suitable search algorithm. This type of application may be useful, for example, in detecting markers in a polymer.

The third modification also relates to the output of the recurrent neural network 30, and may optionally be combined with the first modification.

One of the limitations of the basic method implemented in the analysis system 3 as described above is the reliance on a decoder 36 external to the recurrent neural network 30 to assign symbols to each column of the output of the recurrent neural network 30 and then estimate the series of polymer units from the sequence of symbols. Since the decoder 36 is not part of the recurrent neural network 30 as such, it must be specified upfront and any parameters cannot be trained along with the rest of network without resorting to complex strategies. In addition, the structure of the Viterbi-style decoder used in the basic method prescribes how the history of the current call is represented and constrains the output of the recurrent neural network 30 itself.

The third modification addresses these limitations and involves changing the output of the recurrent neural network 30 to itself output a decision on the identity of successive polymer units of the series of polymer units. In that case, the decisions are fed back into the recurrent neural network 30, preferably unidirectionally. As a result of being so fed back into the recurrent neural network, the decisions inform the subsequently output decisions.

This modification allows the decoding to be moved from the decoder 36 into the recurrent neural network 30, enabling the decoding process to be trained along with all the other parameters of the recurrent neural network 30 and so optimised to calling from the measurements using nanopore sensing. A further advantage of this third modification is that the representation of history used by the recurrent neural network 30 is learned during training and so adapted to the problem of estimating the series of measurements. By feeding decisions back into the recurrent neural network 30, past decisions can be used by the recurrent neural network 30 to improve prediction of future polymer units.

Several known search methods can be used in conjunction with this method in order to correct past decisions which later appear to be bad. One example of such a method is backtracking, where in response to the recurrent neural network 30 making a low scoring decision, the process rewinds several steps and tries an alternative choice. Another such method is beam search, in which a list of high-scoring history states is kept and at each step the recurrent neural network 30 is used to predict the next polymer unit of the best one.

To illustrate how decoding may be performed, FIG. 14 shows the implementation of the third modification in the final layers of the recurrent neural network 30 and may be compared to FIG. 15 which shows the final layers of the recurrent neural network 30 when implementing the basic method as shown in FIG. 4. Each of FIGS. 14 and 15 show the final bidirectional recurrent layer 34 which by way of non-limitative example has the structure of recurrent units 66 shown in FIG. 8. For brevity in FIGS. 14 and 15, the lines combining the output of the recurrent units 66 with their hidden state before being passed to next recurrent unit 66 are not shown.

However, the final feed-forward layer 35 and the softmax layer 36 of the recurrent neural network 30 shown in FIG. 4 is replaced by a decision layer 45 that outputs decisions on the identity of successive polymer units of the series of polymer units. The decision layer 45 may be implemented by argmax units 46 which each output a respective decision.

Output of decisions, i.e. by the argmax units 46, proceeds sequentially and the final output estimate of the series of polymer units is constructed by appending a new fragment at each step.

Unlike the basic method, each decision is fed back into recurrent neural network 30, in this example being the final bidirectional recurrent layer 34, in particular into the forwards sub-layer 68 (although it could alternatively be the backwards sub-layer 69) thereof. This allows the internal representation of the forwards sub-layer 68 to be informed by the actual decision that has already been produced. The motivation for the feed-back is that there may be several sequences compatible with the input features and straight posterior decoding of the output of a recurrent neural network 30 creates an average of these sequences that is potentially inconsistent and so in general worse that any individual that contributes to it. The feed-back mechanism allows the recurrent neural network 30 to condition its internal state on the actual call being made and so pick out a consistent individual series of in a manner more reminiscent of Viterbi decoding.

The processing is effectively reversible and may proceed in either direction along the polymer, and hence in either direction along the recurrent neural network 30.

The feed-back may be performed by passing each decision (the called symbol) into an embedding unit 47 that emits a vector specific to each symbol.

At each step the output of the lowest bidirectional recurrent layer 34 is projected into the output space, for which each dimension is associated with a fragment of the series of measurements, then argmax decoding is used in the respective argmax units 46 to select the output decision (about the identity of the fragment). The decision is then fed back into the next recurrent unit 66 along in the bidirectional via the embedding unit 47. Every possible decision is associated with a vector in an embedding space and the vector corresponding to the decision just made is combined with the hidden state produced by the current recurrent unit 66 before it is input into the next recurrent unit 66.

By feeding back the decisions into the recurrent neural network 30, the internal representation of the recurrent neural network 30 is informed by both the history of estimated sequence fragments and the measurements. A different formulation of feed back would be where the history of estimated sequence fragments is represented using a separate unidirectional recurrent neural network, the inputs to this recurrent neural network at step is the embedding of the decision and the output is a weight for each decision. These weights are then combined with the weights from processing the measurements in the recurrent neural network before making the argmax decision about the next sequence fragment. Using a separate recurrent neural network in this manner has similarities to the 'sequence transduction' method disclosed in Graves, Sequence Transduction with Recurrent Neural Networks, In International Conference on Machine Learning: Representation Learning Workshop, 2012 and is a special case of the third modification.

The parameters of the recurrent unit 66 into which the embedding of the decision is fed back are constrained so that its state is factored to two parts whose updates are only dependent on either the output of the upper layers of the recurrent neural network 30 prior to the final bidirectional recurrent layer 34 or embedded decisions.

Training of the third modification may be performed as follows.

To make output of the recurrent neural network 30 compatible with training using the perplexity, or other probability or entropy based objective functions, the recurrent neural network 30 shown in FIG. 14 may be adapted for the purpose of training as shown in either of FIG. 16 or 17 by the addition of softmax units 48. The softmax units 48 apply the softmax functor to the output (the softmax unit being as previously described but without applying an affine transform) of the final bidirectional recurrent layer 34. Then training is performed on the output of the softmax units 48 by perplexity as shown by elements 49. In the example of FIG. 16, the softmax units 48 replace the argmax units 46 and the training labels output by softmax units 48 are fed back, whereas in the example of FIG. 17, the softmax units 48 are arranged in parallel with the argmax units 46 and the decisions output by the argmax units 46 are fed back.

Rather than the hard decisions about the fragment of the series of polymers made by the argmax units 46, the softmax units 48 create outputs that can be interpreted as a probability distribution over fragments of the series of polymer and so are trainable by perplexity. Since the softmax functor implemented in the softmax units 48 preserves the order of its inputs, the argmax of this unit is the same as what would have been obtained if it had not been added to the recurrent neural network 30. Even when the recurrent neural network 30 has been trained it can be advantageous to leave the softmax unit in the recurrent neural network 30 since it provides a measure of confidence in the decision.

The dependence of the recurrent neural network 30 on its output up to a given step poses problems for training since a change in parameters that causes the output decision at any step to change requires crossing a non-differentiable boundary and optimisation can be difficult. One way to avoid problems with non-differentiability is to train the recurrent neural network 30 using the perplexity objective but pretend that the call was perfect up to that point, feeding the training table to the embedding units 47 rather than the decision that would have been made. Training in this manner produces a network that performs fine provided the sequence fragment call are correct but may be extremely sensitive to errors since it has not been trained to recover from a poor call.

Training may be performed with a two-stage approach. Firstly the training labels are fed back into the recurrent neural network 30, as described above and shown in FIG. 16. Secondly the actual calls made are fed back in but still calculating perplexity via a softmax unit 48, as shown in FIG. 17. The motivation for this two stage process is that the first stage finds good starting parameters for the second stage, thereby reducing the chance that training gets stuck in a bad parameter region because of the afore mentioned non-differentiability.

What is claimed is:

1. A method of high-rate sequencing of polymers using a nanopore measurement and analysis system, the method comprising:
   placing a polymer into the nanopore measurement and analysis system; and
   sequencing the polymer using the nanopore measurement and analysis system at least in part by:
      translocating at least a portion of the polymer through a nanopore of the nanopore measurement and analysis system at a sequencing rate in the range of 10-1000 polymer units per second, wherein the sequencing rate reflects a rate at which the polymer translocates through the nanopore;
      measuring, using the nanopore measurement and analysis system, electrical signals generated during the translocating of the polymer through the nanopore, at a sampling rate greater than or equal to the sequencing rate, to generate a series of measurements;
      estimating, using a convolutional neural network comprising a convolutional layer and a recurrent neural network comprising a bidirectional recurrent layer, the bidirectional recurrent layer comprising a plurality of long short-term memory (LSTM) units, a series of polymer units within the polymer at least in part by:
         converting the series of measurements into a series of feature vectors by applying the convolutional neural network comprising the convolutional layer to a series of groups of measurements derived from the series of measurements, wherein the series of feature vectors include a first feature vector corresponding to a first group of measurements in the series of groups of measurements;
         processing the series of feature vectors using the recurrent neural network comprising the bidirectional recurrent layer to obtain respective outputs including a first output corresponding to a first feature vector in the series of feature vectors, wherein the first output represents, in respect of different respective historical sequences of polymer units corresponding to measurements obtained prior or subsequent to the first group of measurements, posterior probabilities of plural different changes to the respective historical sequences of polymer units; and
         generating the estimate of the series of polymer units within the polymer using the respective outputs obtained using the recurrent neural network comprising the bidirectional recurrent layer.

2. The method according to claim 1, wherein generating the estimate of the series of polymer units using the respective outputs is performed by estimating likelihoods of paths through the respective outputs and identifying a path based on the likelihoods.

3. The method according to claim 1, wherein generating the estimate of the series of polymer units is performed by selecting one of a set of plural reference series of polymer units to which the series of polymer units of the polymer are most similar.

4. The method according to claim 1, wherein generating the estimate of the series of polymer units is performed by estimating differences between the series of polymer units of the polymer and a reference series of polymer units from the respective outputs.

5. The method according to claim 1, wherein the estimate is an estimate of whether part of the series of polymer units of the polymer is a reference series of polymer units.

6. The method according to claim 1, further comprising deriving a score in respect of at least one reference series of polymer units representing a probability of the series of polymer units of the polymer being the reference series of polymer units.

7. The method according to claim 1, wherein the plural different changes include changes that remove a single polymer unit from a beginning or end of a respective historical sequence of polymer units and add a single polymer unit to the end or beginning of the respective historical sequence of polymer units.

8. The method according to claim 1, wherein the plural different changes include changes that remove two or more polymer units from beginning or end of a respective historical sequence of polymer units and add two or more polymer units to the end or beginning of the respective historical sequence of polymer units.

9. The method according to claim 1, wherein the groups of measurements are overlapping groups of measurements.

10. The method of claim 1, wherein the convolutional neural network further comprises a pooling layer, and wherein outputs of the convolutional layer are inputs into the pooling layer.

11. The method of claim 1, wherein the bidirectional recurrent layer comprises a first unidirectional recurrent layer comprising multiple LSTM units of the plurality of LSTM units connected in a first direction, and a second unidirectional recurrent layer comprising multiple LSTM units of the plurality of LSTM units connected in a second direction, opposite the first direction, and wherein outputs of the first unidirectional recurrent layer are inputs into the second unidirectional recurrent layer.

12. The method of claim 11, wherein processing the series of feature vectors using the recurrent neural network comprises updating state vectors of LSTM units of the first unidirectional recurrent layer based on the feature vectors and state vectors of LSTM units preceding the multiple LSTM units in the first unidirectional recurrent layer, and updating state vectors of LSTM units of the second unidirectional recurrent layer based on outputs of the first unidirectional recurrent layer and state vectors of LSTM units preceding the multiple LSTM units in the second unidirectional recurrent layer.

13. The method of claim 1, wherein the polymer is a polynucleotide, and contains at least 30 kilobases (kB).

14. A nanopore measurement and analysis system, comprising:
a nanopore measurement system configured to perform:
sequencing a polymer using the nanopore measurement and analysis system at least in part by:
translocating at least a portion of the polymer through a nanopore of the nanopore measurement and analysis system at a sequencing rate in the range of 10-1000 polymer units per second, wherein the sequencing rate reflects a rate at which the polymer translocates through the nanopore;
measuring electrical signals generated during the translocating of the polymer through the nanopore, at a sampling rate greater than or equal to the sequencing rate, to generate a series of measurements; and
at least one non-transitory computer-readable storage medium storing processor-executable instructions that, when executed by at least one processor of an analysis system, causes the at least processor to perform:
further sequencing the polymer, at least in part by:
estimating, using a convolutional neural network comprising a convolutional layer and a recurrent neural network comprising a bidirectional recurrent layer, the bidirectional recurrent layer comprising a plurality of long short-term memory (LSTM) units, a series of polymer units within the polymer at least in part by:
converting the series of measurements into a series of feature vectors by applying the convolutional neural network comprising the convolutional layer to a series of groups of measurements derived from the series of measurements, the series of feature vectors including a first feature vector corresponding to a first group of measurements in the series of groups of measurements;
processing the series of feature vectors using the recurrent neural network comprising the bidirectional recurrent layer to obtain respective outputs, including a first output corresponding to a first feature vector in the series of feature vectors, wherein the first output represents, in respect of different respective historical sequences of polymer units corresponding to measurements obtained prior or subsequent to the first group of measurements, posterior probabilities of plural different changes to the respective historical sequences of polymer units; and
generating the estimate of the series of polymer units within the polymer using the respective outputs obtained using the recurrent neural network comprising the bidirectional recurrent layer.

15. The system of claim 14, wherein generating the estimate of the series of polymer units using the respective outputs is performed by estimating likelihoods of paths through the respective outputs and identifying a path based on the likelihoods.

16. The system of claim 14, wherein the plural different changes include changes that remove a single polymer unit from a beginning or end of a historical sequence of polymer units and add a single polymer unit to the end or beginning of the respective historical sequence of polymer units.

17. The system of claim 14, wherein the bidirectional recurrent layer comprises a first unidirectional recurrent layer comprising multiple LSTM units of the plurality of LSTM units connected in a first direction, and a second unidirectional recurrent layer comprising multiple LSTM units of the plurality of LSTM units connected in a second direction, opposite the first direction, and wherein outputs of the first unidirectional recurrent layer are inputs into the second unidirectional recurrent layer.

18. At least one non-transitory computer-readable storage medium storing processor-executable instructions that, when executed by at least one computer hardware processor coupled to a nanopore measurement and analysis system, causes the at least one computer hardware processor and the nanopore measurement and analysis system to sequence a polymer at least in part by:
sequencing the polymer using the nanopore measurement and analysis system at least in part by:
obtaining a series of measurements generated from electrical signals measured during translocation of a polymer through a nanopore of a nanopore measurement system at a sequencing rate in the range of 10-1000 polymer units per second, wherein the sequencing rate reflects a rate at which the polymer translocates through the nanopore and wherein the series of measurements are obtained at a sampling rate greater than or equal to the sequencing rate;
estimating, using a convolutional neural network comprising a convolutional layer and a recurrent neural network comprising a bidirectional recurrent layer, the bidirectional recurrent layer comprising a plurality of long short-term memory (LSTM) units, a series of polymer units within the polymer at least in part by:

converting the series of measurements into a series of feature vectors by applying the convolutional neural network comprising the convolutional layer to a series of groups of measurements derived from the series of measurements, the series of feature vectors including a first feature vector corresponding to a first group of measurements in the series of groups of measurements;

processing the series of feature vectors using the recurrent neural network comprising the bidirectional recurrent layer to obtain respective outputs including a first output corresponding to a first feature vector in the series of feature vectors, wherein the first output represents, in respect of different respective historical sequences of polymer units corresponding to measurements obtained prior or subsequent to the first group of measurements, posterior probabilities of plural different changes to the respective historical sequences of polymer units; and generating the estimate of the series of polymer units within the polymer using the respective outputs obtained using the recurrent neural network comprising the bidirectional recurrent layer.

19. The at least one non-transitory computer-readable storage medium of claim 18, wherein the plural different changes include changes that remove a single polymer unit from a beginning or end of a respective historical sequence of polymer units and add a single polymer unit to the end or beginning of the respective historical sequence of polymer units.

20. The at least one non-transitory computer-readable medium of claim 18, wherein the bidirectional recurrent layer comprises a first unidirectional recurrent layer comprising multiple LSTM units of the plurality of LSTM units connected in a first direction, and a second unidirectional recurrent layer comprising multiple LSTM units of the plurality of LSTM units connected in a second direction, opposite the first direction, and wherein outputs of the first unidirectional recurrent layer are inputs into the second unidirectional recurrent layer.

* * * * *